Inventor
Alfred Treff.
By
Mason, Porter, Diller & Stewart
attys.

Nov. 30, 1954  A. TREFF  2,695,941
KEY WELDING MACHINE
Filed May 10, 1948  17 Sheets-Sheet 2

Inventor
Alfred Treff.

By
Mason, Porter, Diller & Stewart
attys.

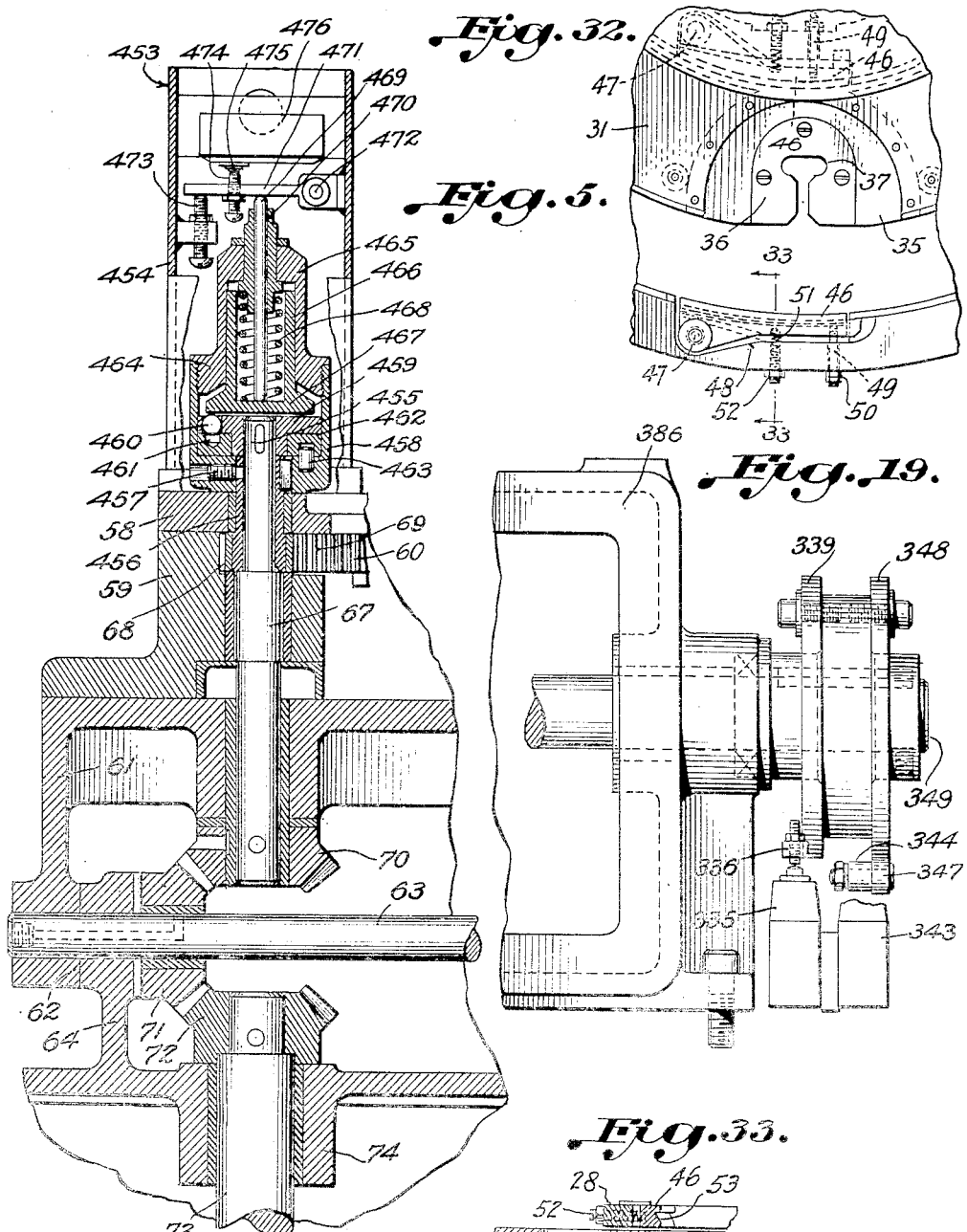

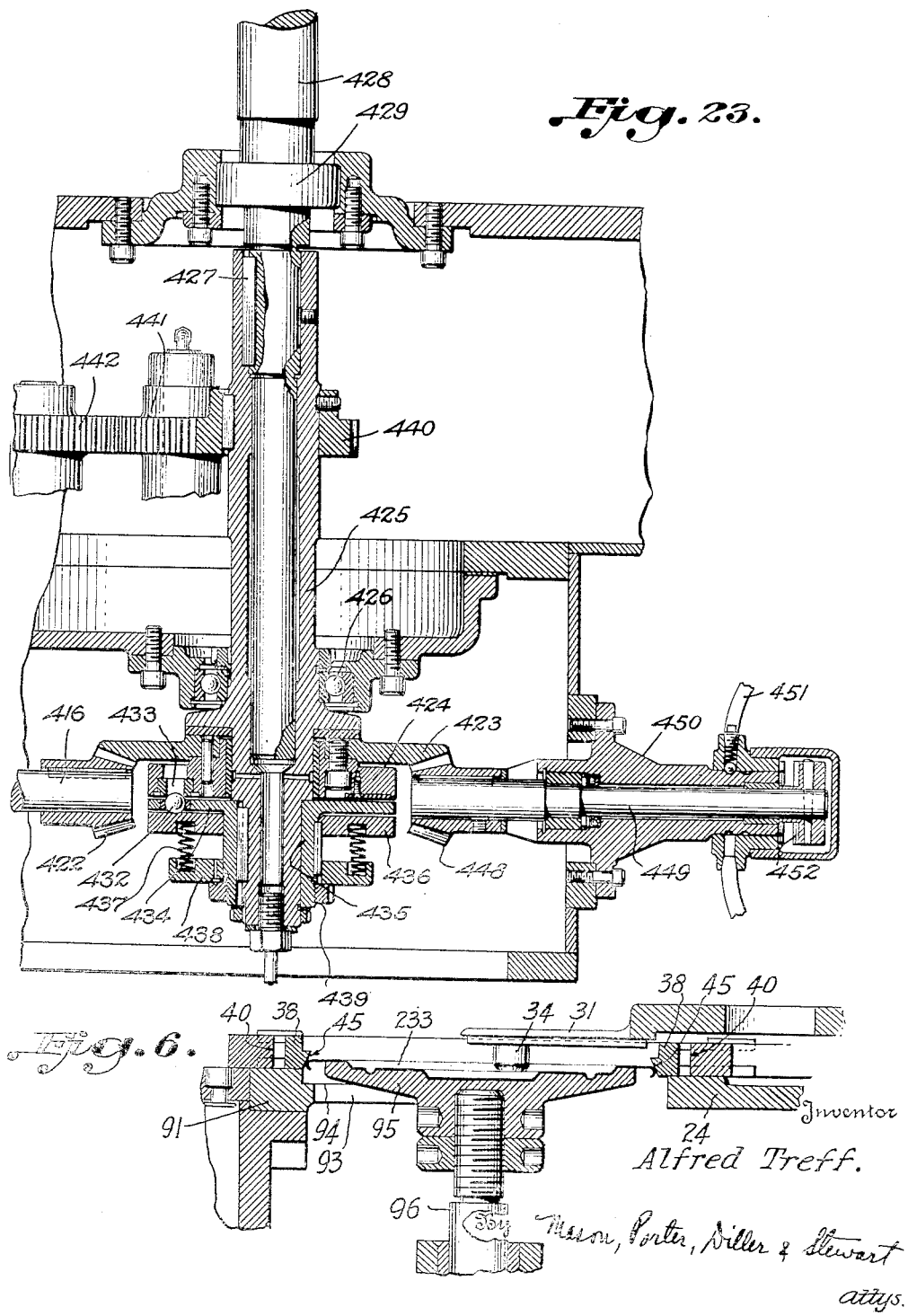

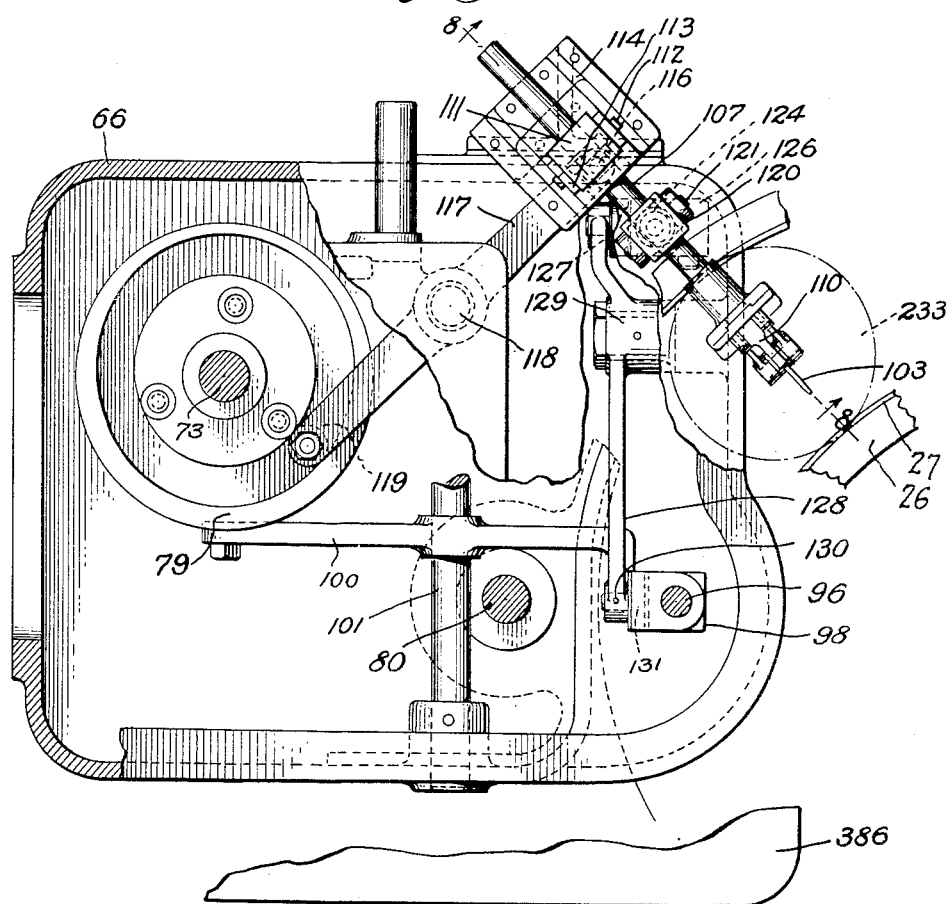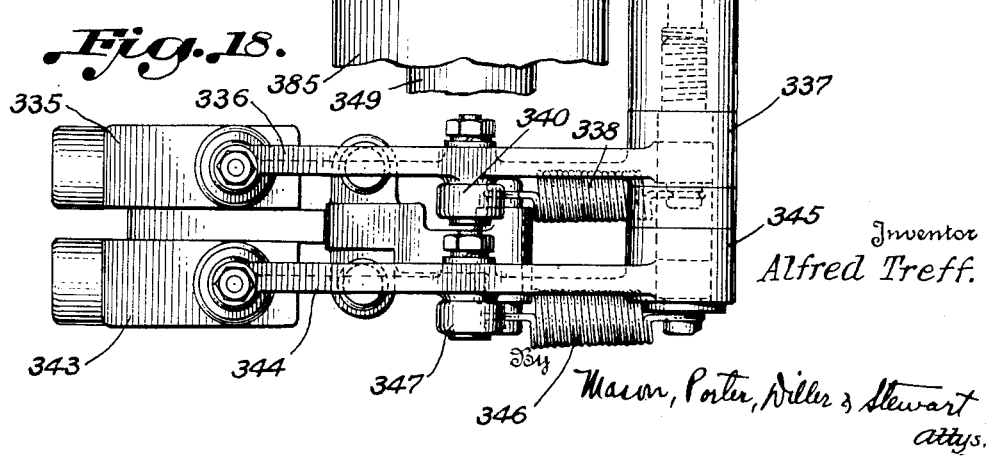

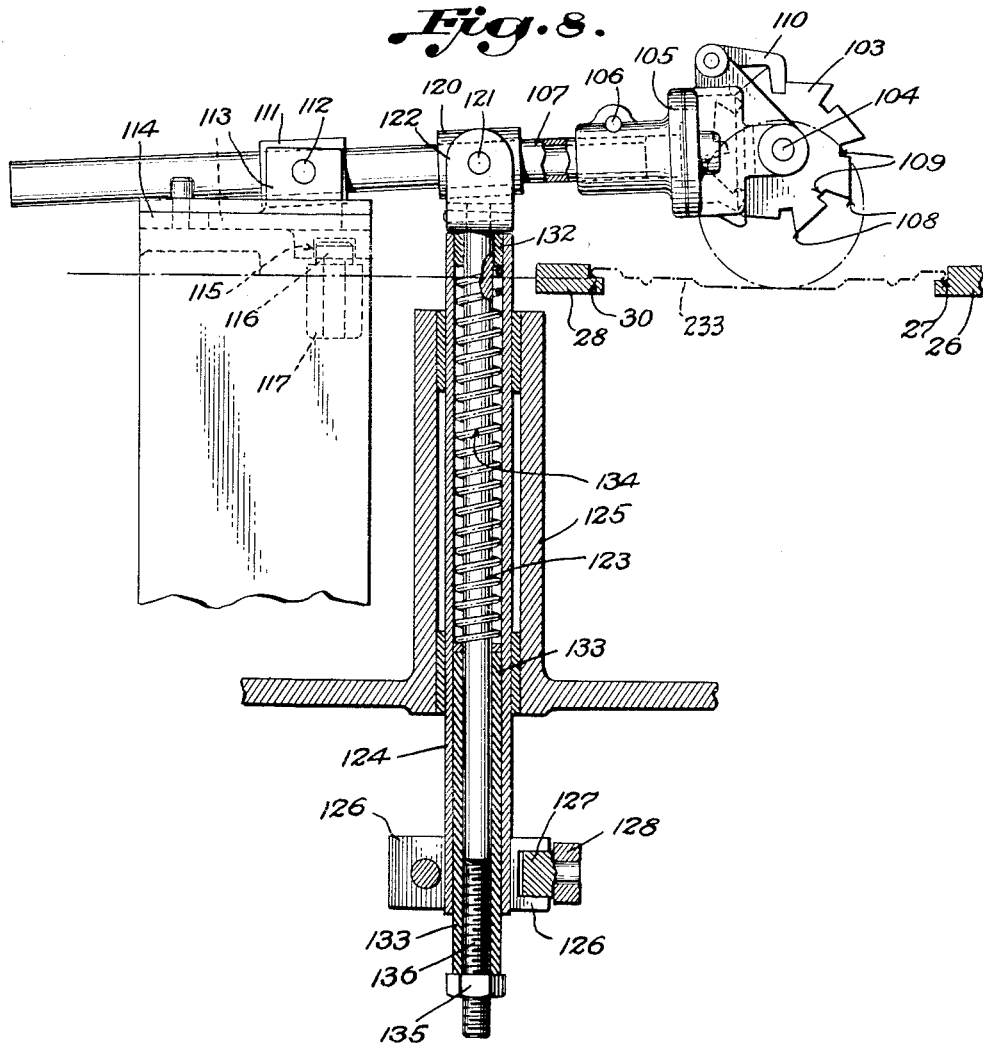
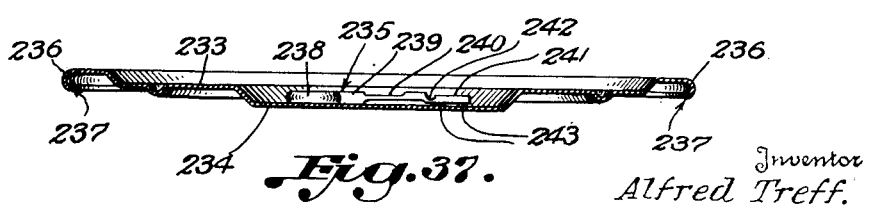
Fig. 8.
Fig. 37.
Inventor
Alfred Treff.
By
Mason, Porter, Diller & Stewart
attys.

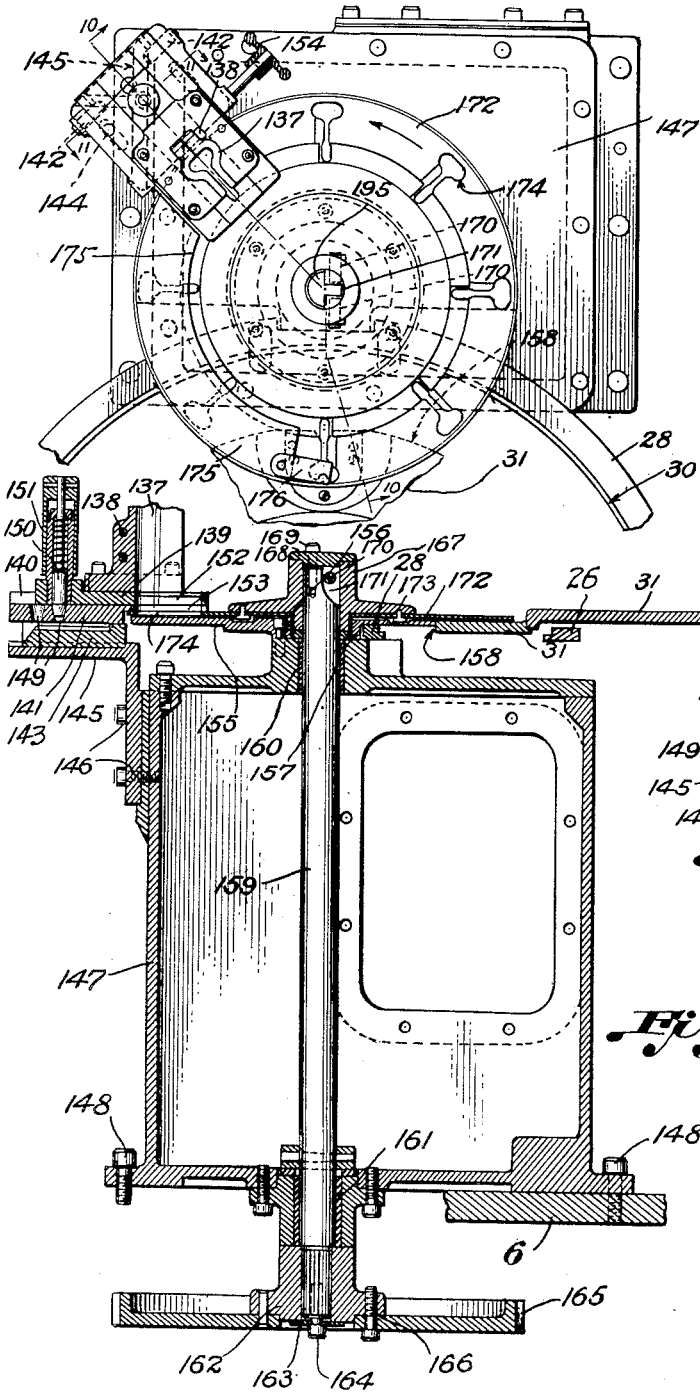

Nov. 30, 1954

A. TREFF 2,695,941

KEY WELDING MACHINE

Filed May 10, 1948

Inventor
Alfred Treff.

By
Mason, Porter, Diller & Stewart
attys.

Nov. 30, 1954

A. TREFF 2,695,941

KEY WELDING MACHINE

Filed May 10, 1948

Inventor
Alfred Treff.

attys.

Nov. 30, 1954     A. TREFF     2,695,941
KEY WELDING MACHINE
Filed May 10, 1948     17 Sheets-Sheet 12
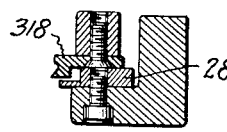
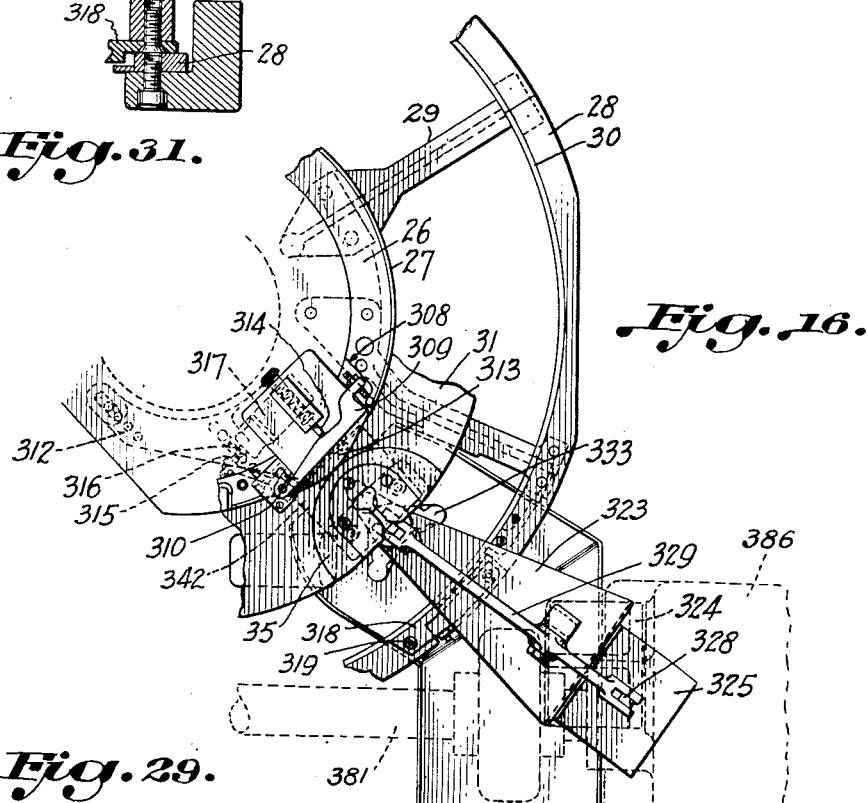
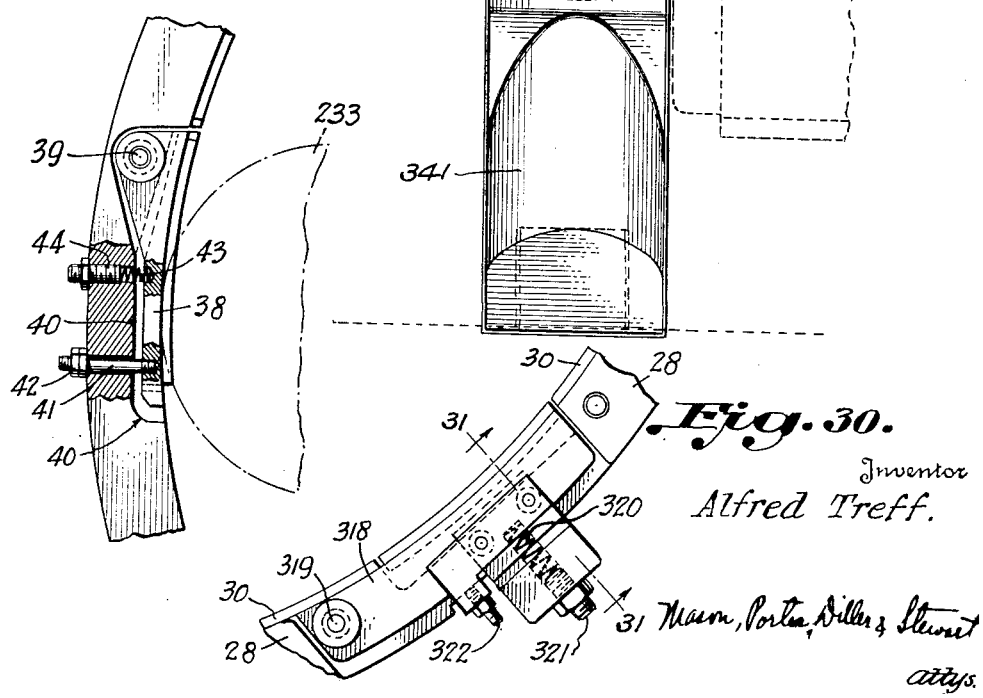
Inventor
Alfred Treff.
Mason, Porter, Diller & Stewart
attys.

Nov. 30, 1954
A. TREFF
2,695,941
KEY WELDING MACHINE
Filed May 10, 1948
17 Sheets-Sheet 13
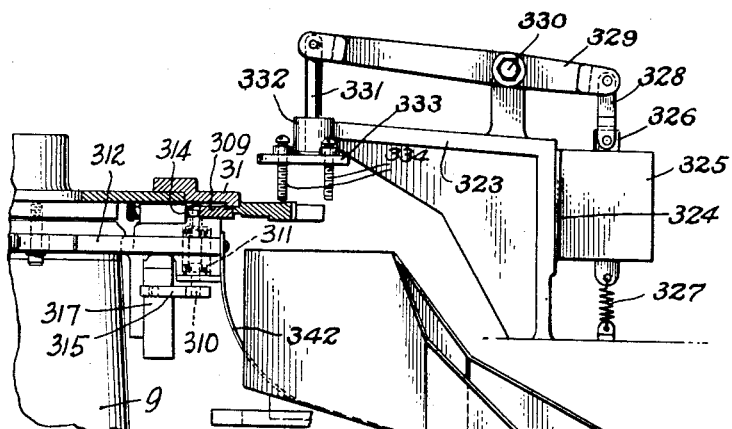
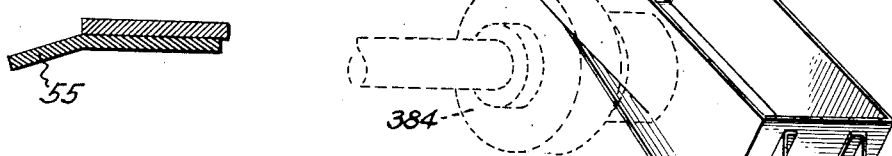
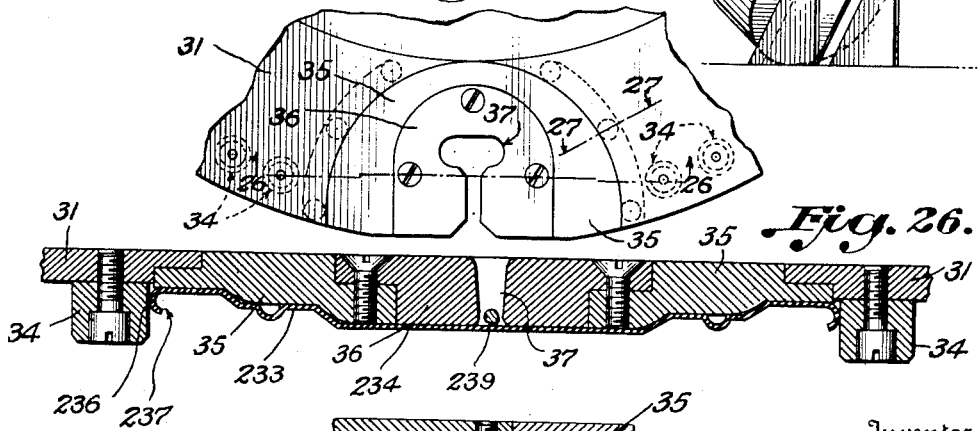
Inventor
Alfred Treff.
By
Mason, Porter, Diller & Stewart
attys.

Inventor
Alfred Treff.

By Mason, Porter, Diller & Stewart
attys.

Nov. 30, 1954 A. TREFF 2,695,941
KEY WELDING MACHINE
Filed May 10, 1948 17 Sheets-Sheet 15

Inventor
Alfred Treff.

By Mann, Porter, Diller & Stewart
attys.

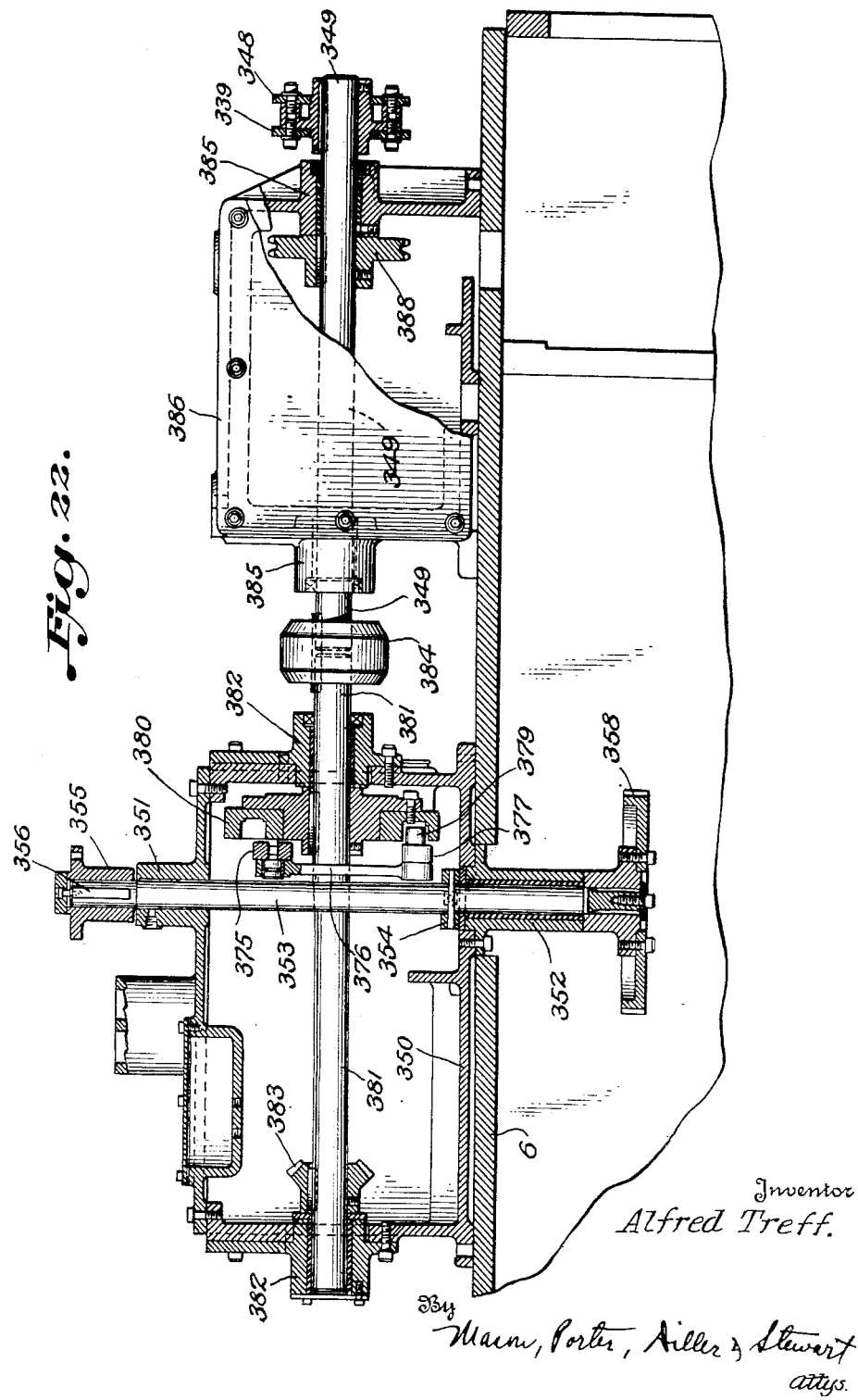

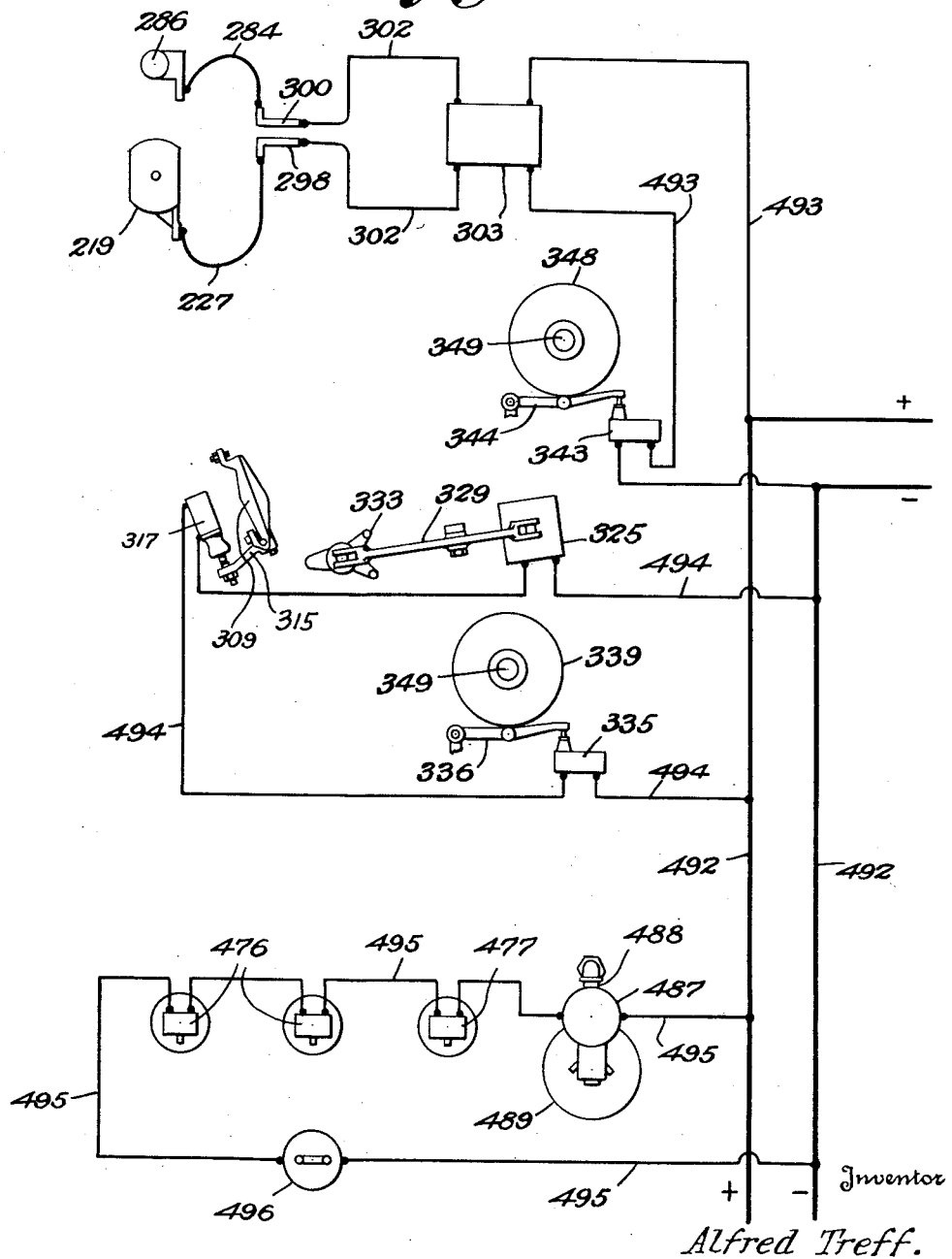

United States Patent Office 2,695,941
Patented Nov. 30, 1954

2,695,941

KEY WELDING MACHINE

Alfred Treff, Chicago, Ill., assignor to Continental Can Company, Inc., New York, N. Y., a corporation of New York Application May 10, 1948, Serial No. 26,170

31 Claims. (Cl. 219—4)

The invention relates generally to the art of welding and primarily seeks to provide a novel machine structure capable of rapidly and securely welding keys on can ends or covers.

Easy opening cans of the tear strip type are well known in the can manufacturing and packaging arts. In this type of can the body is provided with score lines defining a tear strip extending about the can a short distance below the rolled seam by which the end or cover is attached to the body in sealing the can. Such tear strips terminate in tongue extensions to which keys may readily be attached preparatory to the winding of the tear strips thereon and the tearing out of the tear strips along the score lines for the purpose of opening the cans or freeing the ends or covers therefrom in the well known manner. In order to assure that an opening key will be available for the opening of each can it is customary to attach a key to each can, by soldering, welding or otherwise, and this attachment usually is upon the can end or cover which is to be removed in opening the can. It is an object of the present invention to provide a novel machine structure in which are included novel means for rapidly bringing together can ends and the keys to be attached thereto with the keys in the proper position of attachment, and novel means for securely welding the keys to said can ends.

Another object of the invention is to provide in a machine structure of the character stated, a can end supply stack, carrier means, a key supply stack, means for sequentially moving can ends from the supply onto the carrier means, means for moving the keys from the supply and placing one thereof in proper position on each can end on the carrier means, means for welding each key to the can end contacted thereby, and means for stacking the can ends with the keys attached thereon.

It is well known that many can ends have lacquer or other protective or decorative coatings thereon and that such coatings so cover the base metal to which the keys are to be welded as to make it extremely difficult, if not impossible, to accomplish the welding in an efficient manner. Therefore, it is an object of the present invention to provide a machine structure of the character stated in which are included novel means for scratching away surface coatings from the portions of the can ends against which the key surfaces to be welded are to rest, thereby to assure intimate contact between said surfaces and the base metal of the can ends and the efficient attachment of the keys by welding.

It is also well known that in the formation of coated can ends of the type referred to said ends are punched and shaped from coated sheets, thus providing raw metal edges as a result of the cutting through of the punches. Another object of the invention is to provide a machine structure of the character stated in which the welding of the keys to the can ends is accomplished by welding devices including a novel electrode shaped to make electrical contact directly with the raw metal edge of each can end.

Another problem presented in the designing and adaptation of machines for attaching keys to can ends has been that of so handling and controlling the keys prior to the actual attachment thereof as to place the keys against the covers in exactly the right position and place. Many keys have offset extensions joining the shank through weakened portions designed to facilitate removal of the keys at the time cans are to be opened, and said offset portions sometimes are additionally treated in order to facilitate the attachment, as by the provision of solder receiving apertures when the attachment is to be by way of soldering, or by the provision of limited area contact protuberances when the attachment is to be by way of welding. Obviously this particular shaping and conditioning of the keys accentuates the necessity that the keys be very accurately placed in order to assure the secure attachment of each key. The keys must be handled by several instrumentalities prior to actual attachment thereof to the can ends, and if they are not held under complete and constant control at all times and are permitted to move or fall freely for any material distance they may turn askew or completely over in a manner for causing jams or insecure attachment, or even complete failure of attachment. Therefore, it is another object of the invention to provide in a machine of the character stated a novel key supply stack, a pocketed main turret into the pockets of which can ends are fed and having key receiving openings therein of limited depth and effective to receive and accurately place keys on underlying can ends, a key support plate having its upper surface disposed under the supply stack to receive keys therefrom and in the same plane with the top surface of the turret and closely conforming to the turret so that the keys can be moved over said surface and smoothly off the same directly onto the turret, and a feeder plate movable under said stack and over the aligned support plate and turret surfaces and having key openings of shallow depth therein for receiving keys from the stack and transferring them over and allowing them to fall into the turret openings and onto the can ends without any loss of control or material free falling of the keys such as might result in misplacement, or cocking and jamming of the keys.

Another object of the invention is to provide a novel key supply stack so constructed and mounted that it can readily be swung to and retained in an inoperative, out of the way position, means being included for conditioning the stack so that keys may not fall out when the stack is in said out of the way position.

Another object of the invention is to provide in a machine of the character stated novel welding devices including upper and lower electrodes, means for vertically reciprocating the electrodes so as to grip the turret conveyed can end and key complements between them during each welding operation, and means for supplying current to the electrodes, all being cooperatively arranged as a unit readily slidable away from its cooperative relation to the turret in order to facilitate cleaning or replacement of the electrodes.

Another object of the invention is to provide novel welding devices of the character stated in which the electrode moving means are so cooperatively related that one of the electrodes has a central portion engageable with the center of the can end in opposition to the other electrode, and an annularly spaced portion engageable only with the raw metal edge of each can end about a considerable portion of its circumference and so related to the central portion that it will spring the outer annulus of the can end during the welding operation and assure intimate contact between said raw metal edge and said annularly spaced electrode portion.

Another object of the invention is to provide in a machine of the character stated, novel testing means effective to determine if a key is properly welded to each can end, and ejecting means for ejecting all can ends to which no keys have been attached, or can ends to which keys have been attached insecurely.

Another object of the invention is to provide in a machine of the character stated can end supporting ledges which support the can ends as they are moved by the turret, and testing and ejecting means of the character stated in which there are included an ejector, solenoid means for operating the ejector and controlled in part by a normally open switch and devices for closing the switch each time a can end is moving into the testing station, a yieldable guide section at the testing station, a normally closed switch connected in the solenoid circuit in series with the normally open switch, and a tester lever so mounted as to be displaced upon the passing of each can end to which a key has been securely attached in a manner for opening the normally closed switch, the attached key fixing the position of the can end relative to the turret and ledges, said lever being effective to displace from one supporting ledge and against said yieldable guide section a can end devoid of a key or having a key attached thereto insecurely, thus leaving both switches closed and energizing the solenoid to effect an ejecting of the faulty can end.

Another object of the invention is to provide a machine of the character stated in which the can ends are supported at their outer edges on inner and outer ledges as they are positioned in the pockets of the main turret and moved along thereby, in which the can ends are moved into position under the main turret pockets by an infeeding transfer turret and are moved away from the main turret after keys have been attached thereto by a second transfer turret, novel yieldable and opposed spring finger sets being provided to hold the can ends at each of said receiving and discharging stations, and there being included a vertically reciprocable pad for lifting each can end from the transfer turret and placing it in the grasp of the finger set at the receiving station, and a vertically reciprocable suction cup for removing the can ends from the grasp of the finger set at the discharging station and depositing them on the second transfer turret.

Another object of the invention is to provide a can end positioning suction cup means of the character stated including novel means for adjusting the point in the downward movement of the suction cup at which the suction will be broken by the ingress of air.

Another object of the invention is to provide means for stripping from the main turret and supporting ledges any can end which might pass the discharge station by reason of failure of the suction cup, thereby to assure against any jamming of parts at the can end receiving station.

Another object of the invention is to provide a machine structure of the character stated in which the can end supply stack and the can end stacking means are swingably mounted so that they can readily be moved to out of the way positions effective to make the parts at the can end receiving and discharging stations conveniently accessible, and in which there is included a vertically reciprocable pad for lifting can ends with keys attached thereto from the pockets of the second transfer turret into position for being taken up by the stacking devices.

Another object of the invention is to provide in a machine of the character stated, novel control devices effective to stop the machine upon the occurrence of a jam in either the can end infeeding means or in the stacking means, or anywhere else in the machine between the can end feeding and stacking stations.

With the above and other objects in view that will hereinafter appear, the nature of the invention will be more clearly understood by reference to the following detailed description, the appended claims, and the several views illustrated in the accompanying drawings.

In the drawings:

Figure 5 is a fragmentary vertical cross section illustrating the ball safety clutch associated with the can end feed.

Figure 6 is an enlarged fragmentary vertical cross section illustrating the lifting of a can end from the infeeding transfer turret into a main turret pocket and between the inner and outer edge guides.

Figure 7 is a fragmentary plan view illustrating the can end scratching means.

Figure 8 is a detail vertical cross section taken on the line 8—8 on Figure 7.

Figure 9 is an enlarged fragmentary plan view illustrating the key feeding means.

Figure 10 is a detail vertical cross section taken on the line 10—10 on Figure 9.

Figure 11 is a detail vertical cross section taken on the line 11—11 on Figure 9.

Figure 13 is a detail plan view illustrating the lower electrode and its mounting, parts being broken away and in section.

Figure 14 is a fragmentary vertical cross section taken through the axes of the upper and lower electrodes and looking toward the upper electrode supporting devices.

Figure 15 is an enlarged fragmentary vertical cross section illustrating the manner in which the raw metal edge of the can end curls engage the lower electrode.

Figure 16 is an enlarged fragmentary plan view illustrating the weld testing and can end ejecting devices.

Figure 17 is a fragmentary vertical cross sectional view illustrating the parts shown in Figure 16.

Figure 18 is a detail plan view illustrating the adjacent tester and welding circuit control switches and the cooperating actuator levers.

Figure 19 is a detail left end elevation of the levers and switches shown in Figure 18 and the cams for actuating said levers.

Figure 22 is a vertical cross section taken on the line 22—22 on Figure 20.

Figure 23 is a fragmentary horizontal section taken through the axis of the ball safety clutch mounted on the intermediate drive sleeve.

Figure 25 is an enlarged fragmentary plan view illustrating one of the key receiving, can end conveying turret pocket structures.

Figure 26 is a vertical cross section taken on the line 26—26 on Figure 25.

Figure 27 is a vertical cross section taken on the line 27—27 on Figure 25.

Figure 28 is an enlarged fragmentary sectional view showing the upper electrode and a portion of the lower electrode in contact with a can end as in welding a key, the section being taken on the same line on which the section of Figure 12 is taken.

Figure 29 is a fragmentary plan view illustrating one of the yieldable can edge gripper fingers at the receiving station, the outer finger of the pair being shown.

Figure 30 is an enlarged fragmentary plan view illustrating the yieldable finger or track section at the detecting and ejecting station.

Figure 31 is a detail vertical cross section taken on the line 31—31 on Figure 30.

Figure 32 is an enlarged fragmentary plan view illustrating the yieldable can edge gripper fingers at the can end discharging station.

Figure 33 is a detail vertical cross section taken on the line 33—33 on Figure 32.

Figure 34 is a fragmentary vertical longitudinal section illustrating the can end deflector cam.

Figure 36 is a view illustrating diagrammatically the cooperative relation of the several safety control devices effective to stop the machine upon the occurrence of a jam.

Figure 37 is an enlarged detail cross section illustrating a can end and key complement.

*General organization*

Figure 1:
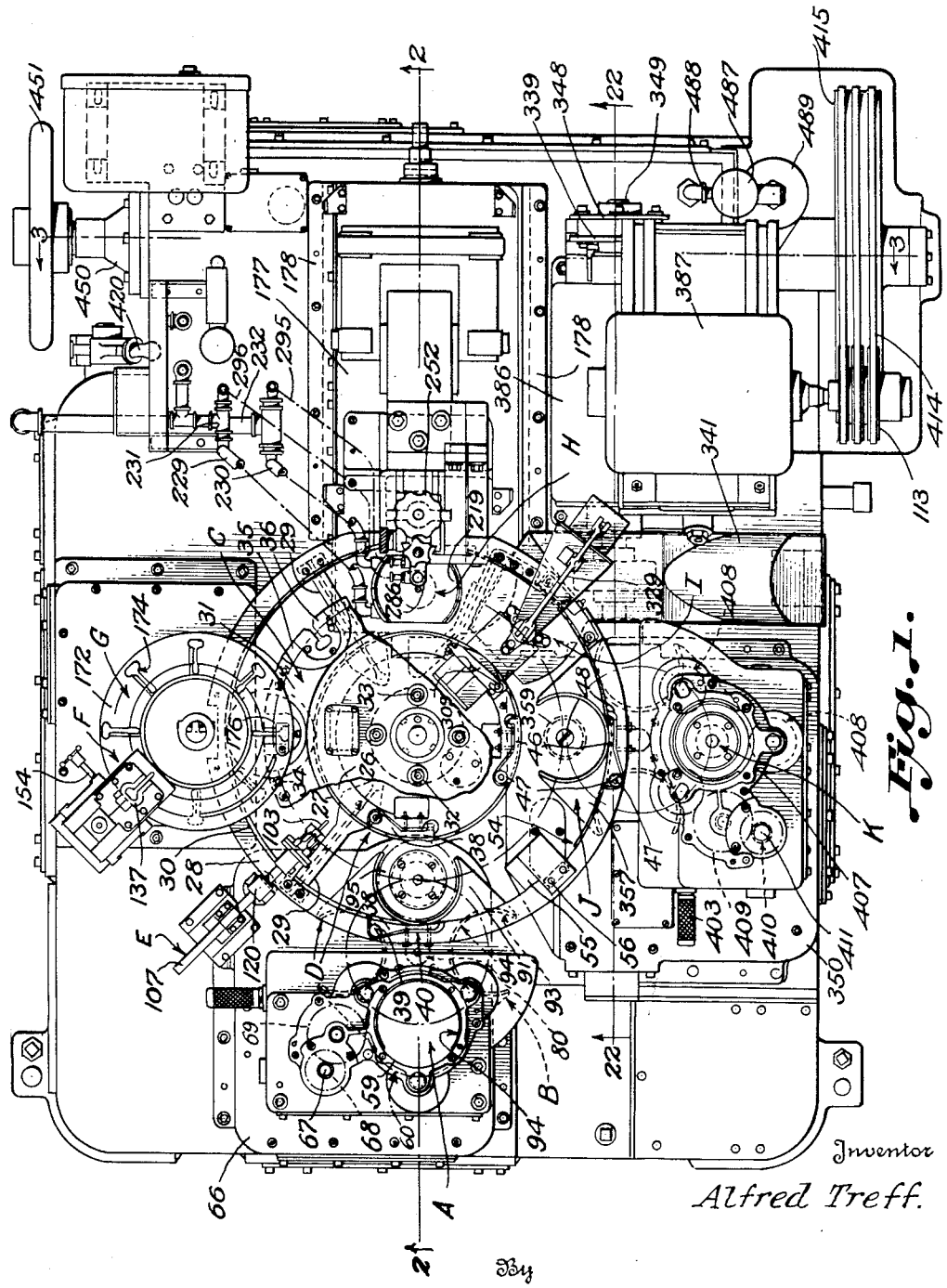
Figure 1 is a plan view of a key welding machine embodying the invention.

In describing the general organization or arrangement of the part assemblies included in the invention, reference is made to Figure 1 of the drawings. In the machine structure herein disclosed as an example of embodiment of the invention the can ends are fed one by one from the bottom of a supply stack A and received on a pocketed, indexed infeeding transfer turret B from the pockets of which said can ends are lifted into the pockets of the indexed main turret C to be moved about thereby over the circular guides generally designated D.

At the station following the infeeding of the can ends into the pockets of the main turret C, scratching means generally designated E is provided and serves the purpose of scratching away a portion of the lacquer or other decorative coatings on the can ends so as to bare the base metal at the position at which the keys are to be welded on the can ends, thereby to assure the making of an efficient weld.

At the following station keys from the supply stack or magazine F are received on the indexed key transfer turret G and are deposited on the can ends as they are presented at said station by the main turret. The next is an idle station, but at the following station the welding means generally designated H functions to securely weld the keys in proper position on the can ends presented at said station by the main turret C.

At the next station testing and ejecting devices generally designated I function to make a test to determine whether the can ends presented at said station are devoid of the intended key equipment, or whether the keys are in fact properly and securely attached. Any can ends devoid of keys, or to which keys have been insecurely welded are ejected from the main turret C and are received in a suitable collecting chute or trough.

The next station might be termed a discharging station, and at this station the can ends with the keys securely welded thereon are received on an indexed, pocketed, outfeeding transfer turret J, and are transferred to a position beneath the stacking devices K into which they are lifted by means which will be described in detail hereinafter.

The can ends which are to have keys welded thereto are placed in the stack A by hand, and the can ends to which keys have been securely welded and which are stacked in the means generally designated K are similarly removed by hand. It is to be understood that the welding devices are mounted as a readily movable unit which may be moved back and forth between its operative position illustrated in Figure 1 and an out-of-the-way position effective to render the main turret accessible and to facilitate the cleaning or replacement of the welding electrodes. It should be understood also that means are provided for automatically stopping the machine in case of a jam in the supply stack, in the stacking means, or elsewhere in the machine.

*Main turret and guide arrangement C—D*

Figure 2:
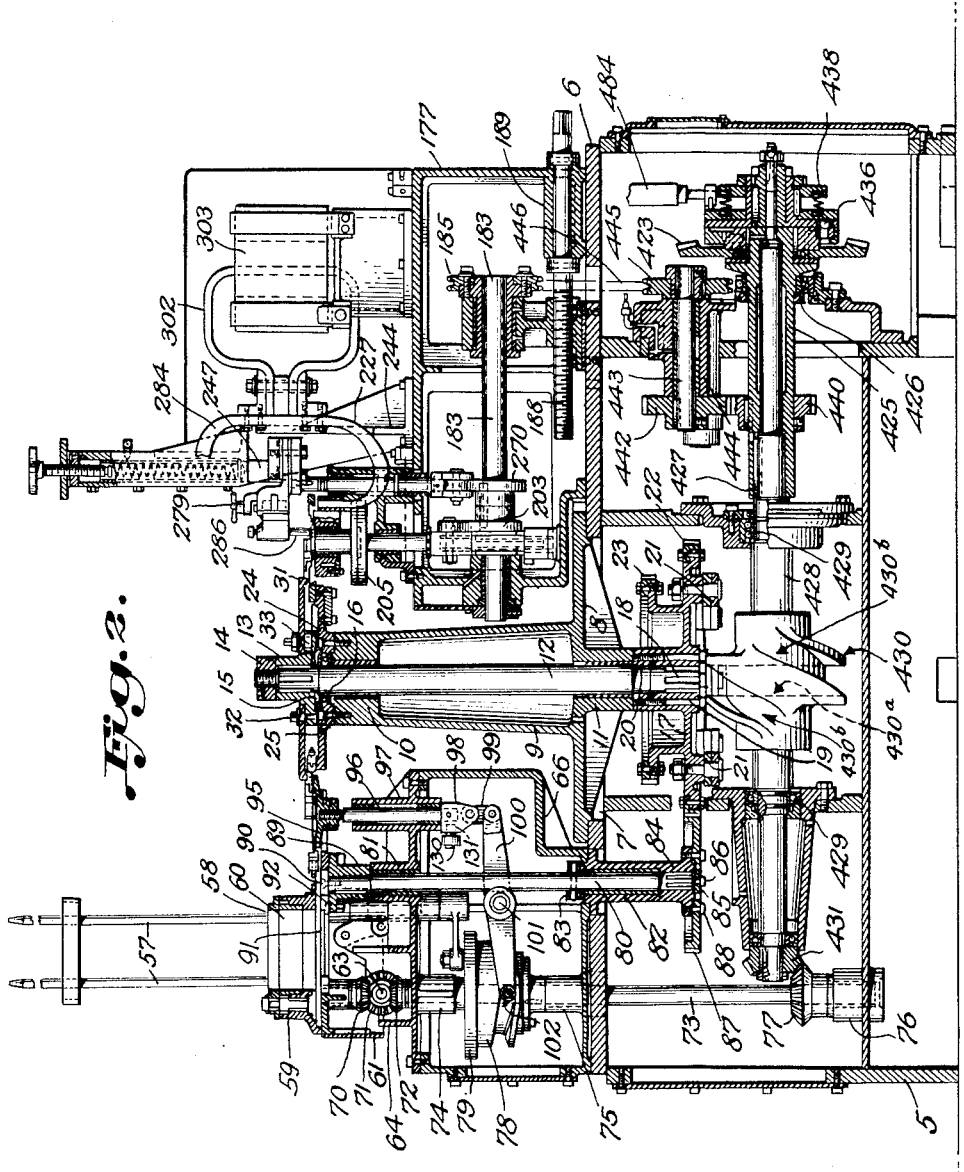
Figure 2 is a complex section taken predominantly on the line 2—2 on Figure 1.

In describing the main turret and can end guide arrangement attention is directed to Figures 1 and 2 of the drawings. The machine includes a base frame generally designated 5 having a table or horizontal supporting portion 6 which is equipped with a generally centrally disposed opening 7. Over the opening 7 is secured a support or base flange 8 from which rises a center column 9.

The column 9 is equipped with upper and lower bearings 10 and 11 in which the uprightly disposed turret shaft 12 is rotatably mounted. The shaft includes a splined upper end portion to which the hub 13 is secured by a lock nut 14, and just beneath the splined portion the shaft is provided with a shoulder engaged by an adapter washer 15 which rests on the thrust bearing 16. See Figure 2.

The driving head 17 is spline-connected as at 18 on the lower end of the shaft 12 and is secured to the shaft by cap screws 19 which pass through the center hub of the driving head and are threaded into the support ring 20 which may be sweated or otherwise secured upon the shaft 12 in the position illustrated in Figure 2. The main turret illustrated in the present disclosure is of the eight-station type, or in other words is provided with eight can end receiving pockets, and it is to be understood that eight indexing rollers 21 are provided and depend in equidistantly spaced relation from the bottom of the driving head 17. A large ring gear 22 is removably secured to the peripheral portion of the driving head 17 and a smaller ring gear 23 is removably affixed to an upward extension from said head.

A support plate 24 is fixedly secured as at 25 to the top of the center column 9, and an inner guide ring 26 is secured on said plate and projects beyond the periphery thereof in the manner illustrated in Figures 1 and 2 of the drawings. The inner guide ring 26 is equipped with a can end edge supporting ledge 27. An outer guide ring 28 also is secured to the support plate 24 through the medium of brackets 29, and it too is equipped with a can end edge supporting ledge 30.

A conveyor plate 31 is adjustably secured as at 32 on the flange projecting from the hub 13, an eccentric adjuster screw 33 being included to facilitate the accurate adjustment or placement of the plate 31 on said flange. As before stated, the main turret plate 31 is equipped with eight equidistantly spaced pockets in its under surface, these being formed in any approved manner for confining and moving the can ends about their arcuate path. In this particular disclosure the can end confining and conveying pockets are formed between depending pins or rollers 34 which engage at opposite edges of the can ends. See Figures 25 and 26. It will also be noted that there is an insulating insert 35 over each pocket, each said insert also serving to support a key pocket or plate 36 having a fall slot 37 therein just large enough to permit a key to pass therethrough and fall upon the underlying can end being moved about by the particular turret pocket. The can end and key complements are moved about by the conveyor pocket pins over the guide ring ledges 27 and 30.

At the can end receiving station shown at the left in Figure 1, a yieldable gripper finger 38 is pivotally supported as at 39 on each of the inner and outer guide rings 26 and 28. A backing clearance 40 is provided in each said ring to permit limited movement of the fingers 38, and the inward movement of each finger is limited by a stop screw 41 and an adjustably mounted stop nut or abutment 42. Each finger 38 also is urged inwardly by a compression spring 43, and the compression of each spring can be adjusted by a backing screw 44. It is to be understood that the opposed gripper fingers 38 yield to receive can ends forced upwardly between them and against their inwardly opposed upwardly bevelled faces 45 at the can end receiving station, and then yieldably hold said can ends in proper position on their horizontal ledge aligning shoulder portions so that they will move onto the aligned guide ring ledges 27 and 28 as the main turret is indexed away from said receiving station. See Figures 6 and 29. The means for lifting the can ends into the main turret pockets will be described hereinafter.

At the can end discharge station similar gripper fingers 46 are provided in opposed relation, each thereof being pivotally supported as at 47 on the inner and outer guide rings 26 and 28. Each of the fingers 46 is free to move opposite a backing clearance 48 formed in the respective guide ring, the inward movement of the fingers being limited by a stop screw 49 and adjustable nut equipment 50 and being urged inwardly by a compression spring 51, the compression of which can be adjusted by a backing screw 52. See Figures 32 and 33. It will be apparent by reference to Figure 33 that the fingers 46 have downwardly bevelled opposing face portions 53 which permit can ends to be discharged from between the yieldable fingers by a downward movement which will cause the can end edge curls to force the fingers apart.

The guide ledge on the outer guide ring 28 terminates as at 54 just beyond the discharge station, in the manner clearly illustrated in Figure 1 and a deflector 55 is supported as at 56 on said outer ring in position for deflecting downwardly any can end and key assembly which might pass the discharge station. In this manner all possibility of a can end and key assembly being moved into the can end receiving station, there to bring about a jam, is eliminated.

*Supply stack A*

The supply stack A and its mounting will be best understood by reference to Figures 1, 2, 4 and 5 of the drawings.

This supply stack includes the can end stack retainer rods 57 which project upwardly from the top ring 58 mounted on the casing 59, wherein is included a stack well defined in part by the ring gear 60. The casing 59 is mounted on the body member 61 which is tiltably supported as at 62 on the shaft 63 which extends through the ears depending from the body member 61 and similar ears projecting upwardly from the base member 64. The base member is in turn secured as at 65 upon the housing 66 which is mounted on the frame structure table portion 6 in the manner illustrated in Figures 2 and 4. It will be apparent by reference to Figures 1, 2, 4 and 5 of the drawings that the ring gear 60 is driven by the upright shaft section 67 through the driving pinion 68 mounted on said section and the interposed idler gear 69 which meshes with said pinion and said ring gear. The shaft section 67 is equipped at its lower end with a bevel pinion 70 to which rotation is imparted by the idler bevel 71 mounted on the shaft 63, said idler being in turn driven by the bevel gear 72 secured on the upper end of the upright driver shaft 73. The driver shaft 73 is rotatable in a bearing 74 depending from the base member 64, in the bearing 75 provided in the housing 66 and in the bearing 76 supported in the lower part of the base 5 in the manner clearly illustrated in Figures 2 and 4. A grooved drum cam 78 is secured upon the shaft 73 within the housing 66 and forms a part of the can end lifting means, and a grooved plate cam 79 is mounted on top of the cam 78 and forms a part of the scratching means drive. Said can end lifting means and said scratching means will be described in detail hereinafter.

*Infeeding transfer turret B*

The devices for receiving the can ends from the supply stack and feeding them to the main turret will be best understood by reference to Figures 1, 2 and 6 of the drawings. The infeed transfer turret structure B includes a shaft 80 uprightly disposed and rotatable in a bearing 81 on the base member 64 and in a bearing 82 secured to and depending from the bottom of the housing 66, said shaft being supported on the last named bearing through the medium of the pin secured collar 83. The shaft 80 has its lower end spline-connected with the hub 84 which is secured on the shaft through the medium of the washer 85 and cap screw equipment 86. A spur gear 87 is secured as at 88 to the hub 84 in position for meshing with and being indexed or driven by the previously mentioned ring gear 22.

At its upper end the shaft 80 has a hub 89 keyed thereon and secured in place by the cap plate and screw equipment 90. A turret plate 91 is secured at 92 to said hub and is equipped with four peripheral open pockets 93, each equipped with a can end edge supporting ledge 94. It will be apparent by reference to Figure 1 of the drawings that each pocket extends about more than 180° of a can end circumference and thus serves to prevent displacement of can ends by centrifugal force as the transfer turret is being indexed.

It will be apparent by reference to Figures 2 and 6 of the drawings that the transfer turret B operates in a horizontal plane below the horizontal plane in which the main turret C is disposed. At the station at which can ends are received in the main turret pockets, or in other words at the position at which the pockets of the transfer turret B are serially brought into registry with the overlying pockets of the main turret C there is provided a lifter pad 95. The lifter pad 95 is secured at the upper end of a rod or plunger 96 which is vertically reciprocable in a bearing 97 formed on the base member 64. A clevis 98 is secured to the lower end of the plunger 96 and is pivot link connected as at 99 to one end of a rocking lever 100 which is pivoted intermediately of its ends as at 101 in the housing 66. The other end of the lever 100 is provided with a roller 102 which is engaged in the groove of the drum cam 78 so that upon rotation of the drum cam the lever 100 will be rocked in the vertical plane and in suitably timed relation to lift the serially presented can ends off the transfer turret pocket ledges 94 and present them between the spring fingers 38 and in the serially registered main turret pockets 34, said spring fingers serving to hold the can ends in position until each indexing movement of the main turret moves the respective can end away from said holding fingers and onto the receiving ledges 27 and 30 of the inner and outer guide rings 26 and 28. It will be apparent by reference to Figure 6 of the drawings that the spring fingers 38 are so shaped that the upward movement of the lifter pad 95 with a can thereon will serve to displace the fingers in a manner for permitting the can end to move between and be held by the spring fingers in the manner stated.

*Can end scratching means E*

As the main turret structure C is indexed from the can end receiving station it brings a can end to the scratching station whereat the can end scratching means E best illustrated in Figures 1, 7 and 8 is located.

The scratching means includes a scratching wheel 103 which is rotatably mounted as at 104 in a head 105 which is secured at 106 at the end of a vertically swingable, longitudinally reciprocable rod 107. The scratching wheel is provided with a multiple of selectively presentable scraper edges 108 and peripheral notches 109 into which the pivotally mounted dog 110 is engageable for the purpose of securing the selected adjustments of the wheel.

The rod 107 has a yoke 111 secured thereon, and the yoke is pivotally secured at 112 on a slide 113 which is slidably supported at 114 in a bracket secured upon the housing 66. The slide 113 is equipped with a downwardly opening transverse groove 115 in which a driver pin 116 engages. The driver pin 116 projects upwardly from one end of a scratching wheel carrying rod reciprocating lever 117 which is pivotally supported intermediately of its ends as at 118 on the housing 66. The other end of the lever 117 is equipped with a roller 119 which is engaged in the groove of the plate cam 79 in the manner clearly illustrated in Figure 7 from which it will be apparent that rotation of the plate cam 79 will impart rocking motion to the lever 117 which will be transmitted through the pin and slide connections 116, 113, 111 in the form of reciprocatory movement to the scratching wheel supporting rod 107.

A sleeve 120 is slidably mounted on the scratching wheel supporting rod 107, and said sleeve is pivoted as at 121 in a clevice 122 secured to the upper end of a rod 123. The rod 123 depends from the clevice through a sleeve 124 which is vertically reciprocally mounted in a bearing 125 formed on the base member 64. A grooved head 126 is secured to the lower end of the sleeve 124, and into the cross groove in said head there is mounted a slide block 127 which is pivotally mounted on one end of a rocker lever 128. The lever 128 is pivoted intermediately of its ends as at 129 on the housing 66 and has its other or longitudinal end pivotally connected as at 130 with a slide block 131 slidable in a cross groove formed in the clevice 98 which is secured to the lower end of the can end lifting plunger 96. It will thus be apparent that the vertical reciprocation of the plunger or rod 96 will impart rocking movement to the lever 128 in a vertical plane and that the rocking lever will vertically reciprocate the sleeve 124 and the rod 123 surrounded thereby and thus oscillate the scratching wheel supporting rod 107 in a vertical plane.

An abutment sleeve 132 slidably surrounds the upper end of the rod 123 and is secured within the sleeve 124. A second abutment sleeve 133 surrounds the lower end of the rod 123 and is slidable within the outer sleeve 124. A compression spring 134 surrounding the rod 123 within the sleeve 124 and between the abutment sleeves 132 and 133 constantly tends to force the rod 123 downwardly and yieldably hold the clevice 122 in contact with the upper end extremity of the sleeve 124. Thus the rod 123, the sleeves 124, 132, and 133 and the spring 134 will move as a unit so long as the scratching wheel 103 is out of contact with a can end supported on the guide ring ledges 27 and 30. However whenever downward movement of the rod and sleeve assembly brings the scratching wheel into contact with a can end supported on the ledges 27 and 30, additional downward movement of the rod 123 and the sleeve 133 will be prevented by reason of the engagement of the sleeve 133 with the abutment 135 threadably mounted as at 136 on the rod 123 and continued downward movement of the sleeve 124 will store energy in the compression spring 134 and tightly press the scratching edge 108 of the scratching wheel 103 against the upper surface of the can end as the wheel is being reciprocated. It will be obvious that by adjusting the position of the abutment nut 135 on the threaded end 136 of the rod 123 the amount of pressure applied against the scratching edge 108 during the reciprocation of the wheel 104 back and forth over the can end surface can be varied at will. It will be obvious that this scratching of the can end surface will remove any protective or decorative coating from that portion of the can end to which the key is to be welded, and by thus baring the base metal of the can end, secure attachment of the key to the can by welding is assured.

When it is desired to present a fresh scratching edge 108 for contact with the serially presented can end, it is a simple matter to swing the locking dog 110 upwardly to free the wheel 103, after which the wheel may be turned slightly to present a fresh scratching edge. By again replacing the locking dog 110 in the underlying securing notch 109 the wheel may again be locked in its selected position.

Key feeding means F—G

The key feeding means and the arrangement thereof is best illustrated in Figures 1 and 9 to 11 of the drawings. The key supplying means includes a key stack supply 137 having a key shaped magazine or opening formed by the assembled half sections secured together as at 138 and mounted upon a slide 139. The slide is slidably guided as at 140 in a support or carrier 141 which is tiltably mounted as at 142 on a base member 143. The base member 143 is adjustably secured as at 144 on the bracket 145 which is secured at 146 to the side of the housing 147, said housing being attached as at 148 upon the frame structure table portion 6.

The carrier 141 is equipped with two recesses 149 in which to receive the end of a spring plunger 150 which is vertically slidable in a casing 151 carried by the slide 139. The slide 139 has a key slot 152 formed therein which in the operative position of the parts illustrated in full lines in Figure 10 is disposed in registry with the key shaped opening or magazine in the stack 137. A similar key slot 153 is formed in the carrier 141 in registry with said stack opening. Whenever it is desired to do so the whole key stack supply assembly may be tilted about its pivotal mounting 142 to an out-of-the-way position in order to make the underlying parts readily accessible, and when this is to be done the spring plunger 150 is retracted from the position illustrated in full lines in Figure 10, the slide 139 is slid back so as to disrupt the registry of its slot 152 with the key supply slot and thereby prevent falling out of keys and the insertion of the spring plunger in the other of the receiving recesses 149 will secure the slide in the key retaining position referred to until it is again desired to put the key supply into operation. When the key supply stack is thus tilted to its out-of-the-way position, its tilted position may be retained by engaging the threadably mounted retainer 154 with the tilted stack.

A key supporting plate 155 is stationarily secured as at 156 on the housing 147, said plate being cut away as at 157 to clear the outer guide ring 28. The plate 155 also has an arcuate cut out or clearance 158 formed therein which conforms to the periphery of and lies very close to the main turret plate 31. This arrangement of the plates 155 and 31 places the top surfaces of the plates flush and in the same plane so that keys may readily be moved from the top surface of the plate 155 onto the top surface of the plate 31 with ease and without any danger of displacement of the keys.

A key feeder shaft 159 is provided and is uprightly disposed and rotatable in upper and lower bearings respectively designated 160 and 161 and provided on the housing 147 in the manner clearly illustrated in Figure 10. A hub 162 is spline connected to the lower end of the shaft 159 and is secured on the shaft by a retainer washer 163 and the securing screw 164. A spur gear 165 is secured as at 166 to the hub 162 and is disposed in position to mesh with and be indexed or driven by the gear 23 which is rotatable with the main turret shaft 12.

Another hub 167 is mounted on the upper end of the shaft 159, being secured thereon by the cap 168 and screw 169. Adjuster screws 170 also are provided and are threaded through the hub 167 in position for engaging at opposite sides of a rib 171 formed on the upper end of the shaft in the manner clearly illustrated in Figures 9 and 10. It will be apparent that by suitably adjusting the screws 170 it is possible to accurately adjust the position of the hub 167 about the axis of the shaft 159.

A key feeder plate 172 is secured as at 173 to the adjustably mounted upper hub 167 in the manner clearly illustrated in Figures 9 and 10 of the drawings. The plate 172 is of a thickness approximating the thickness of the keys to be welded to the can ends and is provided with eight equidistantly spaced key receiving and conveyor apertures 174, each shaped to receive and rather closely confine a key without hindering free falling thereof, and adapted to accurately register with the stack supply opening and the slide and carrier openings 152 and 153 at the supply station. The feeder plate 172 closely overlies the stationary key supporting plate 155, being spaced approximately .010 above the latter. As the main turret is indexed in the clockwise direction, it will serve to index the key feeder plate 172 in a counter-clockwise direction to serially present the key receiving openings under the supply stack. Each time a key is received from the supply stack by one of the plate openings 174, a key will be presented by one of the openings 174 at the delivery station, and will fall from the feeder plate opening into the underlying key receiving opening of the particular main turret pocket and onto the can end in said pocket. While the keys are being conveyed in a counter-clockwise direction from the supply stack to the main turret pockets they are held against displacement from the feeder plate openings 174 by an overlying arcuate retainer plate 175 which is stationarily mounted. It will also be apparent by reference to Figure 9 that a key displacer finger 176 is mounted on and extends from the free end of the hold-down plate 175 in position for pressing against each key at the delivery station, and facilitating the depositing of the key into the receiving slot or opening in the then registering main turret pocket.

Welding means H

The welding means H will be best understood by reference to Figures 1, 2, 13 to 15 and 28 of the drawings. This means includes a housing 177 which is slidably mounted as at 178 on the framing structure table portion 6. The slidable mounting of the welding devices makes it possible to move said devices toward or from the operative position shown in Figures 1, 2 and 12. The welding devices may be moved about seven inches toward the right from the position illustrated in Figure 12, and thus the associated turret structures are rendered readily accessible, and cleaning and replacement of the electrodes is greatly facilitated.

Within the housing 177 a cam shaft 179 is rotatably mounted in a bearing 180 formed in the end of the housing, and in a bearing 181 fixedly mounted as at 182 on the frame structure table portion 6. The shaft 179 has a splined end portion 183 which is slidable through the spline sleeve 184 rotatably mounted in the fixed bearing 180, and which carries a driver sprocket 185 through which rotation is imparted to the sleeve and the shaft in a manner to be described hereinafter. Suitable collar means 186 is provided to hold the shaft against longitudinal movement relative to the housing 177.

The fixed bearing 181 also is equipped with an internally threaded sleeve portion 187 through which an adjuster screw shaft 188 is threaded. The shaft 188 has a smooth portion rotatably mounted in a smooth bore in the sleeve portion 189 of the housing 177, and the shaft is held against longitudinal movement relative to said sleeve portion by a collar 190 secured thereon. The shaft includes a non-circular end portion 191 to which a wrench may be applied for imparting rotation to the shaft. It will be apparent that by rotating the threaded shaft 188 the same will be cause to travel endwise in one direction or the other relative to the fixed bearing sleeve portion 187, and the whole welding means assembly supported by the housing 177 will be caused to move with said screw shaft in the manner previously described.

An electrode supporting plunger 192 is vertically reciprocable in a bearing 193 formed in the bearing member 194 which is secured as at 195 on the housing 177. A pair of upright guide rods 196 bearing parallel spaced relation to each other and to the plunger 192 disposed between them are secured at their upper ends as at 197 in the bearing member 194, and at their lower ends in a support member 198 which is secured to a portion of the housing 177. The rods 196 serve as guides for a vertically reciprocable cross head 199 which is attached at 200 to the plunger 192 and has a roller 201 secured thereon as at 202 in position for resting upon the lower electrode lifting and lowering cam 203. The cam 203 is secured on the cam shaft 179, and compression springs 204 interposed between the cross head 199 and the bearing member 194 serve to constantly urge the plunger downwardly so as to hold the roller 201 in contact with the cam. It will be apparent that as the shaft 179 is rotated the plunger 192 will be lifted and lowered.

A support pad 205 is carried at the upper end of the plunger 192, and to it a plate 206 is secured as at 207. An upstanding plug 208 is screw secured as at 209 to the plate 206, and suitable pin and socket means 210 serves to prevent turning of the plug on said plate. A lower electrode surrounds the plug and includes a center hub or sleeve 211 and an outer wall consisting of two arcuate wall portions 212, each concentric with the axis of the plug, and two flat parallel side walls 213 forming a hollow chamber 214 between said walls and the center hub. A single obstruction wall 215 is provided in the chamber 214 and the chamber is closed by a removable plate or cover 216 which is secured to the side walls as at 217 in a manner for making the hollow chamber liquid tight. Cooperating pin and recess means 218 is effective to prevent turning of the lower electrode assembly on the supporting plate assembly 206, 205.

It will be apparent by reference to Figures 13 to 15 of the drawings that the lower electrode includes upstanding arcuate portions 219 extending upwardly from the arcuate walls 212, and said extensions are bevelled at their outer surfaces as at 220. An insulator plate 221 is removably secured to the top of the plug 208 and a metal bumper plate 222 is removably secured to the top surface of said insulator plate. It will be noted also by reference to Figure 14 that insulator sleeves 223 and 224 surround the plug 208 within the lower electrode hub portion 211 and below the same.

A contact bracket 225 extends from the lower electrode and is secured as at 226 to the lower secondary lead 227. See Figures 12, 13 and 14.

At each side of the obstruction wall 215 there is provided a coolant connector 228 communicating with the hollow interior 214 of the lower electrode. These connectors 228 are connected through ducts 229 and 230 respectively with the coolant supply source 231 and the return connector 232. Thus it is possible to maintain a coolant circulation through the hollow chamber 214 in the lower electrode, the obstruction wall 215 serving to cause the coolant to flow all the way around the chamber in a manner which will be apparent by reference to Figure 13.

One of the can ends to which a key is attached is indicated at 233 (Figures 26, 28 and 37), and it will be noted that said end includes a central depression 234 adapted to be engaged by the bumper plate 222 and to which the key generally designated 235 is welded. The flange of the can end is curled as at 236 and presents a raw metal edge 237 in position for providing a good electrical contact with the bevelled edge portions 220 of the lower electrode in the manner clearly illustrated in Figure 15. Each key 235 preferably includes the usual head 238, the shank 239 flattened and slotted as at 240, and the offset and flattened attachment extension 241 which is joined with the shank at the weakened portion 242 designed to facilitate breaking off of the key after the attachment extension has been weld-secured to the can end. It is preferred that the flattened attachment extension 241 be provided with two depending tits 243 disposed to intermittently contact the can end at the portion thereof which has been bared of protective or decorative coating in the manner previously described and thereby facilitate secure welding.

Figure 12:
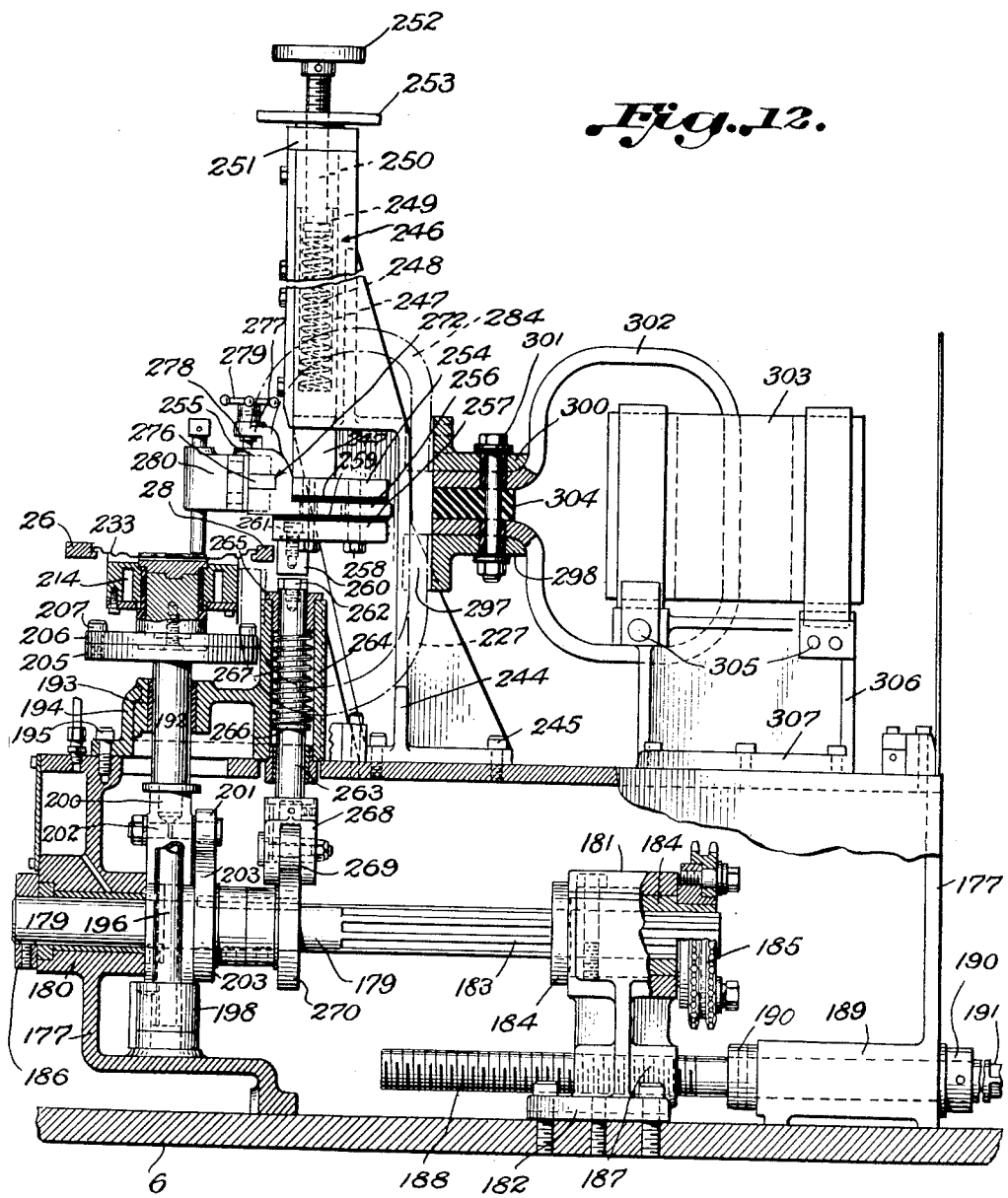
Figure 12 is an enlarged fragmentary vertical cross section illustrating the welding devices, the upper and lower electrodes being shown in contact with the key and can end respectively.

A support bracket 244 secured as at 245 on the housing 177 includes a vertical guide-way or bearing 246 in which an upper electrode supporting tube 247 is slidably mounted in the manner clearly illustrated in Figure 12 of the drawings. A compression spring 248 engaging at the bottom of the tube 247 abuts an adjustable abutment head 249 at its upper end, said abutment head being freely rotatable at the lower end of an adjuster screw 250. The adjuster screw 250 is threaded through a cap block 251 mounted on the bearing 246. The spring constantly tends to force the upper electrode supporting tube 247 downwardly, and the compression of the spring can be varied at will by turning the adjuster screw 250, the selected adjustment being secured by manipulation of the jam nut 253.

A support plate 254 is secured in any approved manner to the lower end of the upper electrode supporting tube 247, and the upper electrode carrier bracket 255 is removably attached to the plate 254 by having its plate extension 256 clamped to the plate 254 by a securing plate 257 through the medium of cap screws 258 passing through the plates 257 and 256 and threaded into the plate 254. Suitable insulator members 259 are interposed between the plate 257 and the plate extension 256, and between said plate extension and the plate 254. An abutment block 260 is secured as at 261 to depend from the lowermost plate 257.

It will be apparent by reference to Figures 2 and 12 of the drawings that the abutment block 260 is disposed to be engaged by a hardened bumper plate 262 secured on the top of the upper electrode lifting and lowering plunger 263 which is vertically reciprocable in a bearing 264 forming a part of the bearing member 194 and through the guide and abutment collar 265 mounted in the upper end of said bearing. An abutment flange 266 is provided on the plunger 263, and a compression spring 267 interposed between said flange and the collar 265 constantly tends to force the plunger downwardly. The plunger is equipped with a clevice 268 at its lower end in which is mounted a roller 269 disposed to constantly engage the plunger lifting and lowering cam 270. The cam 270 is secured on the cam shaft 179, and it will be apparent that as the shaft is rotated the plunger 263 will be lifted and lowered. In Figure 12 of the drawings the upper electrode is shown in contact with a can end and key complement, and the plunger 263 is at its lowermost position with the bumper plate 262 spaced slightly below the abutment block 260. In this position the upper electrode is held tightly against the can end and key complement by the compression spring 248. As the cam shaft 179 is rotated the plunger 263 will be lifted and contact of the bumper plate 262 with the abutment block 260 will be effective to lift the upper electrode to its elevated position against the compression of the spring 248.

The upper electrode carrying bracket 255 is provided with a vertically disposed dove-tail grooveway 271 and is traversed at one side by a cross groove 272 which is aligned at the other side with an aperture 273. A clamp bolt 274 passes through the aperture 273 and has a tightener nut 275 mounted thereon. The bolt 274 is equipped at its other end with a hook portion 276 which is operable in the cross groove 272 in the manner clearly illustrated in Figure 13. The upper electrode carrying bracket 255 also is equipped with an overhanging bracket arm 277 which overlies the dove-tail grooveway 271 and is equipped with a freely rotatable captive screw 278 including a turning knob 279.

The upper electrode carrier 280 includes a body extension 281 in the form of a dove-tail which is vertically slidable in the grooveway 271, and the captive screw 278 is threaded into a tap in said extension so that upon rotation of the screw, upward or downward movement will be imparted to the body extension 281 in the dove-tail grooveway. The carrier 280 also includes an extension 282 which is secured as at 283 to the upper secondary lead 284 in the manner clearly illustrated in Figures 12 and 13.

The upper electrode carrier 280 also includes a hollow cylindrical body portion 285 in the lower end of which the upper electrode 286 is secured. Said electrode is in the form of a hollow tube closed at the lower end which is disposed for contact with the can end and key complements presented at the welding station. A plunger or plug 287 is mounted in the cylindrical body 285 and extends upwardly therefrom through a gland 288. A tube 289 depends from the lower end of the plug 287 well down into the hollow of the electrode 286 and inwardly spaced from the inner walls thereof with its lower end extremity above the bottom of the hollow within said electrode. The interior or hollow portion of the tube 289 extends well up into the plug 287 where it connects through an internal duct 290 with an annular clearance 291 which is in turn connected through the duct 292 with a coolant outlet connector 293. A coolant inlet connector 294 is adapted to direct coolant into the interior of the electrode about the tube 289. It will be apparent by reference to Figure 1 of the drawings that a duct 295 connects the outlet connector 293 with the coolant return connection 232, and a duct 296 connects the inlet connector 294 with the coolant supply source, thereby to provide a circulation of coolant through the upper electrode.

The lower secondary lead 227 is secured as at 297 with a contact bracket 298, and the upper secondary lead 284 is secured as at 299 with a contact bracket 300, said brackets being secured as at 301 to the ends of the secondary loop 302 connected with the transformer 303, and an insulator block 304 being interposed between the ends of the loop in the manner clearly illustrated in Figure 12. It will be apparent by reference to Figure 12 that the bolts securing the brackets 298 and 300 and the ends of the loop 302 in assembly are suitably insulated.

The transformer 303 is secured as at 305 upon a supporting bracket 306 which is secured as at 307 upon the housing 177.

During each welding operation the upper and lower electrodes 286, 219 are brought together against the can end and key complement presented at the welding station by cooperative contact of the lifting and lowering cams 270 and 203 with the respective lifting and lowering plungers 263 and 192. In the coming together of the upper and lower electrodes, the upper electrode engages the key and presses the underlying, centrally depressed can end portion against the bumper plate 222, the upper electrode being yieldably pressed against the key by the compression spring 248. The parts are so cooperatively arranged that the bevelled edge portions 220 of the lower electrode will engage the raw metal edge 237 of the can end and spring the outer portion of the can end upward slightly off the supporting ledges 27 and 30 of the guide rings 26 and 28. In this manner efficient electrical contact of the upper electrode with the key and of the lower electrode with the raw metal edge portion of the can end curl is assured. It is to be understood that the welding circuit is controlled by a cam operated switch to be described hereinafter. See Figure 28.

*Testing and ejecting means I*

The means provided at the testing and ejecting station for testing the can end and key complements to ascertain if keys have been securely welded to the can ends, and for ejecting can ends which are devoid of keys or to which keys have been insecurely attached, will be best understood by reference to Figures 1, 16, 17, 18 and 19. At said testing and ejecting station the inner guide ring 26 is recessed as at 308 to receive a tester lever 309 which is secured to the upper end of a shaft 310 rockably mounted in a bearing 311 provided in a bracket 312 which is secured to the support plate 24. The lever 309 includes a portion 313 which extends over the can edge supporting ledge 27 in position for being engaged by each can end moved into the testing and ejecting station by the main turret. An adjustable spring plunger 314 constantly urges the lever 308, 313 outwardly to the can end intercepting position referred to, and a switch actuator arm 315 secured to the lower end of the shaft 310 is normally engaged with the plunger 316 of a micro switch 317 which is supported on the bracket 312, said arm serving to normally hold the switch in its control circuit closing position.

Opposite the lever 309 the outer guide ring 28 is recessed to mount a yieldable ring section 318 which is pivotally mounted as at 319 on the outer ring 28 and urged inwardly by a compression spring 320 backed up by an adjustable screw 321. The inward movement of the ring section 318 is limited by an adjustably mounted screw 322. It will be apparent by reference to Figures 30 and 31 of the drawings that the ring section 318 has a groove in its inner face aligned with the can edge supporting ledge 30 and the downwardly bevelled lower portion of which will permit downward forcing of a can end out of the holding groove with an attendant outward displacement of the yieldably mounted section or finger 318. As each can end and welded key complement is moved by the main turret into the testing and ejecting station, the key being confined in the key slot over the turret pocket will hold the can end against radial outward movement, assuming that the weld is properly secured. Thus in the case of the passage of each can end to which a key is properly welded the lever portion 313 will be deflected inwardly, thereby displacing the arm 315 and permitting the micro switch 317 to open. However, whenever a can end devoid of a key, or to which a key has been insecurely welded is moved into the testing and ejecting station, the absence of the key or the insecure attachment thereof will permit the lever portion 313 to displace the can end radially outwardly and no opening of the switch 317 will be effected. The yieldable ring section 318 will permit this radial outward displacement of the can ends devoid of keys or to which keys have been insecurely welded.

On the bracket 323 rigidly supported as at 324 is mounted a solenoid 325, the core 326 of which is uprightly disposed and held down by an anchored spring 327. At its upper end the core is link connected at 328 to one end of a lever 329 which is pivotally supported intermediately of its ends as at 330 on the bracket 323. The other end of the lever is connected to the plunger 331 which is vertically slidable in the bracket bearing 332, and at its lower end the plunger carries an ejector plate 333 from which three adjustably mounted ejector members 334 depend.

The solenoid 325 is adapted to be connected with a source of power through the micro switch 317 and a micro switch 335 connect in series therewith and with said power source. The switch 335 is normally open and is closed each time a can end approaches the testing and ejecting station by a bell crank lever 336 which is rockably mounted as at 337 and is held by an anchored spring 338 in its out-of-the-way position. A rotary cam 339 engaging the roller 340 projecting from the lever 336 serves to engage the lever with the switch 335 at the proper time in order to close the same, and it is to be understood that the ejector functions only when both switches 317 and 335 are closed at the same time. Thus whenever the cam 339 has effected a closing of the normally open switch 335, and the passing of a properly welded can end and key complement has displaced the lever 309 and arm 315 so as to open the switch 317, the solenoid 325 will not be energized and no ejecting action will take place. However, whenever the closing of the switch 335 by the action of the cam 339 is attended by the movement into the testing and ejecting station of a can end devoid of a key, or one to which a key has been insecurely attached, in both of which instances the lever portion 313 will deflect the can end radially outwardly and not effect an opening of the switch 317, the circuit through the solenoid 325 will be completed and the ejector members 334 will be forced to descend and force the faulty can end downwardly into the collecting trough or chute 341. If desired, a yieldable plate 342 may be suitably mounted and extended into the entrance of the collecting trough or chute so as to properly guide and break the fall of the ejected can ends. See Figures 16 and 17.

A similar micro-switch 343 is disposed beside the previously mentioned switch 335 and this also is a normally open switch the plunger of which is engageable by the lever 344 which is rockably mounted as at 345 and is constantly urged by the spring 346 in a direction for holding the roller 347 carried by said lever in contact with the weld timing cam 348. It will be apparent by reference to Figures 1, 3 and 19 of the drawings that both of the cams 348 and 339 are keyed on the shaft 349, the mounting and the manner of driving of which will be described in detail hereinafter.

*The can end discharging and stacking means J—K*

In describing this equipment attention is directed to Figures 1, 4, 20, 21 and 22 of the drawings. At the can end discharging and stacking station a housing 350 is secured upon the frame structure table portion 6 and is constructed to provide upper and lower bearings 351 and 352 in which the uprightly disposed discharge shaft 353 is rotatably mounted, the same having a collar 354 secured thereon in position for resting upon the lower bearing 352 in the manner clearly illustrated in Figure 22. A hub 355 is adjustably secured to the upper end of the shaft 353 in the same manner as the previously described key feeder hub 167, and this hub is secured as at 356 to a four-pocket transfer turret 357 which is formed in the same manner as the previously described infeeding transfer turret 91. A driver gear 358 is secured to the lower end of the shaft 353 in position for meshing with the ring gear 22, and in this manner the indexing movements of the main turret are imparted to the transfer turret 357.

Figure 20:
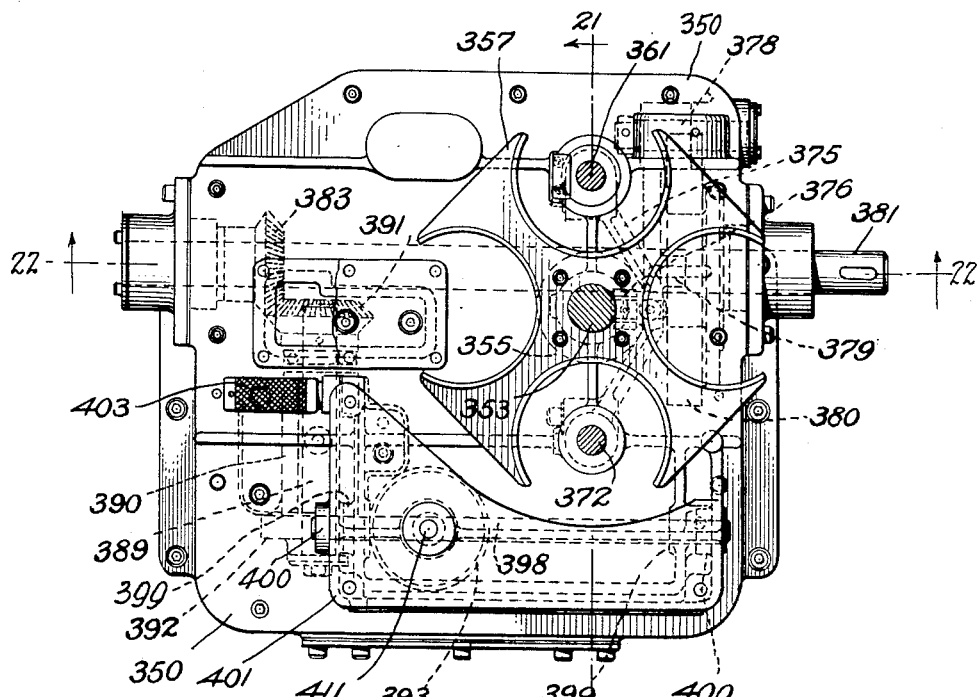
Figure 20 is an enlarged fragmentary plan view and part horizontal section illustrating the parts at the key bearing can end discharging and stacking station, the stacking means being removed from its hingedly mounted support.
Figures 21, 24:
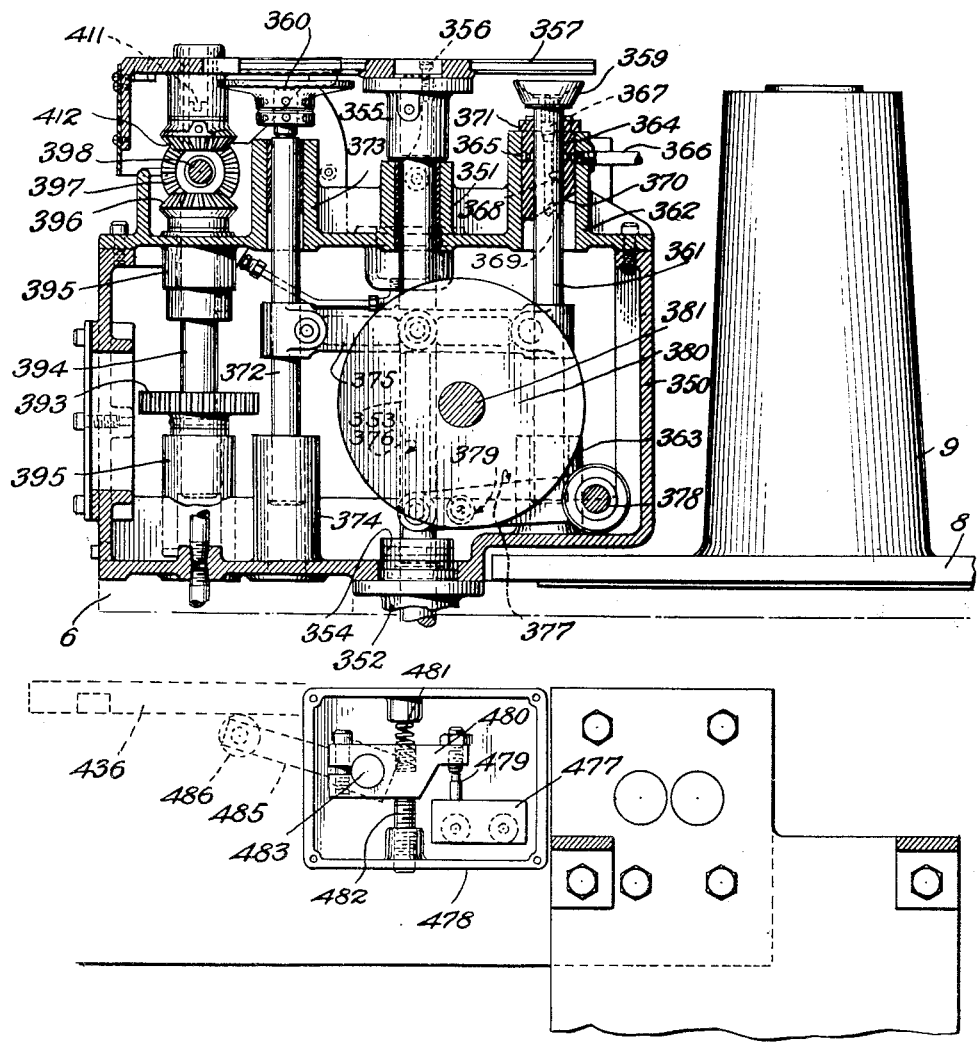
Figure 21 is a fragmentary vertical cross section taken on the line 21—21 on Figure 20.
Figure 24 is an enlarged detail plan view illustrating the control switch associated with the intermediate drive sleeve mounted ball safety clutch.

At the positions of the two transfer turret pockets which are diametrically oppositely aligned at the can end discharging and stacking station are provided a suction cup 359 which is vertically reciprocable for the purpose of lowering can ends from between the yieldable fingers 46 and the then presented main turret pocket into the underlying discharge transfer turret pocket, and a lifter pad 360 which is vertically reciprocable for simultaneously lifting a can end from the transfer turret pocket then under the stacking means into position for being picked up by the stacking devices. The means for supporting and vertically reciprocating the suction cup 359 and the lifter pad 360 is best shown in Figures 20 and 21 and will now be described.

The suction cup 359 is secured to the upper end of a plunger 361 which is vertically reciprocable in upper and lower bearings 362 and 363 provided on the housing 350. A slide guide sleeve mounted in the upper bearing 362 is equipped with annular duct means 365 connected with a vacuum line 366. The plunger 361 is equipped with an axial duct 367 opening upwardly into the cup 359 and having an upper cross duct 368 adapted to communicate with the annular duct 365 each time the plunger 361 is lifted, and a lower cut-off duct 369 adapted to cooperate with the angularly disposed lower edge 370 of the sleeve 364. It will be apparent by reference to Figure 21 that each time the plunger is lifted the cut-off duct 369 will first be closed, and then as the cross duct 368 communicates with the annular duct 365 the interior of the suction cup 359 will be evacuated so as to grip a can end engaged thereby. When the plunger is moved downwardly the can end gripping evacuation of the cup will continue until the cut-off duct 369 moves beyond the lower end of the sleeve 364 to admit air at atmospheric pressure and break the suction. By turning the sleeve 364 about its axis by manipulation of the head 371 the point at which the cut-off duct 369 will move below the effective end portion of the sleeve may be varied.

The lifter pad 360 is secured to the upper end of a plunger 372 which is vertically reciprocable in upper and lower bearings 373 and 374 provided on the housing 350. A yoke 375 is secured to both plungers 361 and 372 and is pivot link connected as at 376 to one end of an actuator arm 377. The arm 377 is pivoted as at 378 at its other end to the housing 350 and is equipped with a roller 379 engaging in a groove in the cam plate 380 which is fixed on the shaft 381. The shaft 381 is rotatably mounted in bearings 382 on the housing 350 and has a driver bevel gear 383 fixed thereon within said housing. The shaft extends without the housing 350 where it is connected by a flexible coupling 384 with the previously mentioned shaft 349 to which the cams 338 and 348 are secured, said shaft 349 being rotatably mounted in bearings 385 provided therefor in the housing 386 whereon the main driving motor 387 is supported. Within the housing 386 the shaft 349 has a sprocket 388 secured thereon, and through this sprocket rotation is imparted to the shaft assembly 349, 381 in a manner to be described hereinafter.

Figure 35:
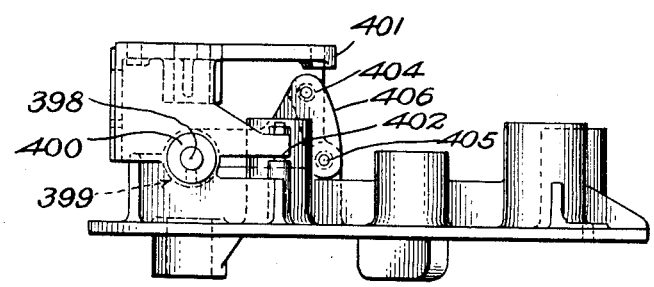
Figure 35 is a detail side elevation illustrating the tiltable support upon which the can end and key complement stacking means is supported.

Within the housing 350 a cross shaft 389 is rotatably mounted in a bearing 390. The cross shaft has a bevel gear 391 secured to one end thereof in position for meshing with and being driven by the bevel gear 383 secured on the shaft 381, and at its other end the cross shaft carries a spiral gear 392 which meshes with and drives the spiral gear 393 secured on the lower end of the shaft 394. The shaft 394 is uprightly disposed and rotatable in bearings 395 provided on the housing 350, and a driver bevel gear 396 is secured on the upper end of said shaft above the housing top. The driver bevel gear 396 meshes with and drives an idler bevel gear 397 which is rotatable about a shaft 398 supported in and forming a pivotal connection between the ears 399 projecting upwardly from the top of the housing 350 and the ears 400 which depend from the supporting body member 401 whereon the can end stacking devices are mounted. The pivotal mounting of the supporting member 401 permits the upward swinging away of the can end stacking devices, and downward swinging movement of said supporting member and devices is limited by the adjustable stop means 402 so as to accurately position the stacking devices when in operation. A spring plunger 403 engageable in recesses 404 and 405 in the segment 406 extending upwardly from the housing top serves to secure the supporting member 402 in its operative position shown in Figure 35 or in the previously mentioned upwardly swung out-of-the-way position. This mounting of the can end stacking devices is identical to that of the previously described can end supply stack means A.

The housing 407 of the can end stacking means is supported on the swingably mounted member 401, and within it are mounted a plurality of stacking screws 408 which are driven by ring gear and pinion connections as in the case of the can end separators of the previously described supply stack means A. The ring gear which drives the stacking screws is driven by the idler gear 409 which is in turn driven by the pinion 410 mounted on the driver shaft section 411 to the lower end of which is secured the driver bevel gear 412 to which rotation is imparted by the previously mentioned bevel gear 397.

*Driving or power applying means*

Figure 3:
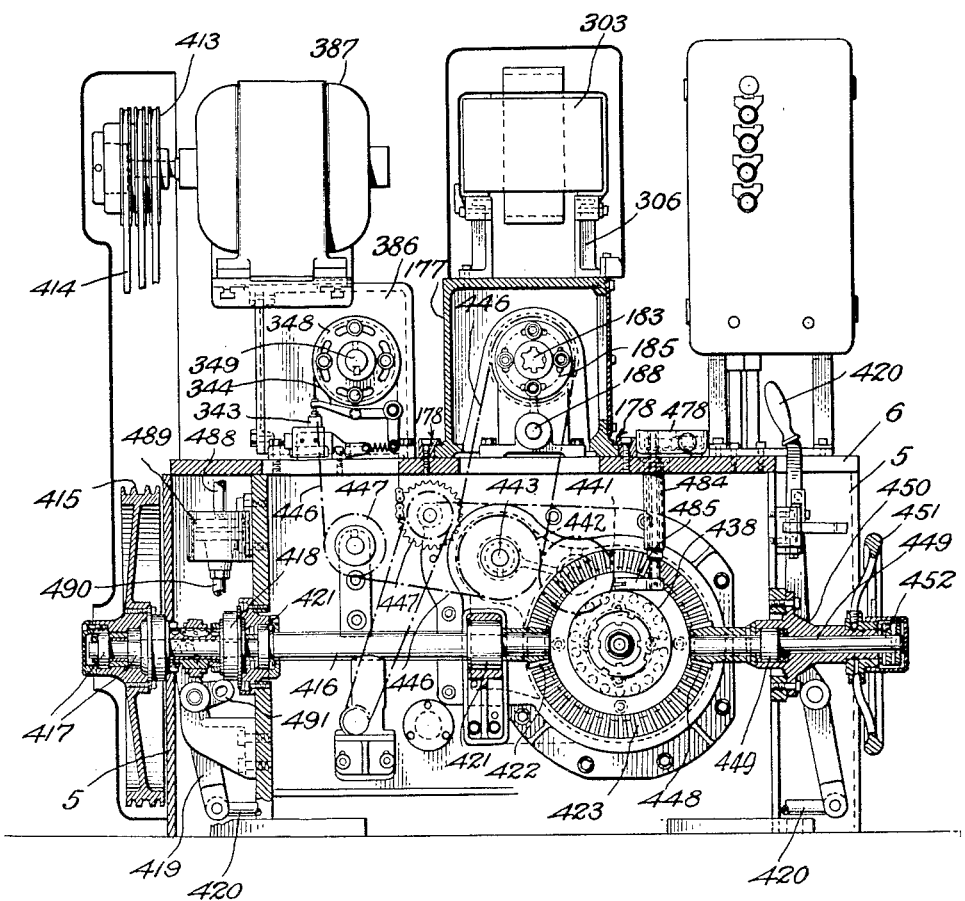
Figure 3 is a vertical cross section taken on the line 3—3 on Figure 1.

This means, best shown in Figures 2, 3 and 23, includes the previously mentioned motor 387, the small pulley 413, the belt transmission 414 and the large pulley 415 which is loose on the driver shaft 416, being rotatable about the anti-friction bearings 417 and adapted to drive said shaft only when the clutch 418 is suitably engaged. The clutch 418 is manipulated by the shifter means 419 which is operable through the manual control devices 420. The clutch also is adapted to be automatically manipulated through safety controls to be described hereinafter. It will be apparent by reference to Figure 3 that the driver shaft 416 is rotatable in antirifriction bearings 421 supported on the base frame 5.

It will be apparent by reference to Figures 3 and 23 of the drawings that a driver bevel gear 422 is secured on the inner end of the shaft 416 in position for meshing with and driving the large bevel gear 423 which is secured to a hub 424 freely rotatable about the intermediate drive sleeve 425. The sleeve 425 is rotatably supported in bearing means 426 and is keyed as at 427 to the main cam shaft 428. The shaft 428 is rotatable in anti-friction bearings 429, and to it the indexing cam 430 is secured in position for engaging the indexing rollers 21 and imparting the desired indexing movement to the main turret. The indexing cam 430 is of conventional form such as is shown in Figure 1 of the U. S. Letters Patent 2,392,728 issued to Diezel on January 8, 1946, and includes the usual turret position holding circumferential groove portion 430ᵃ and the usual indexing roller entrance and exit or indexing portions 430ᵇ. The shaft 428 also has a driver bevel pinion 431 secured thereon in position for meshing with and driving the bevel gear 77 secured on the supply stack and cam driving shaft 73.

The hub 424 and large gear 423 are normally driven by engagement of the balls 432 in recesses 433 provided in said hub, the balls being mounted in seats provided in the driver plate 434 which has its hub portion 435 keyed to the intermediate drive sleeve 425. It will be apparent by reference to Figure 23 that the balls 432 are yieldably held in driving contact in the recesses 433 by the plate 436. The plate 436 is slidable on the hub portion of the driver plate 434 and is spring pressed by compression springs 437 interposed between it and the abutment plate 438 also slidable on said hub and being adjustable, as to position for varying the compression of the springs 437 and the torque under which this overload release will function, by adjustment of the nut 439. It will be apparent that rotation of the shaft 416 will be imparted to the gear 423 and through it to the intermediate drive sleeve 425 so long as the predetermined torque is not exceeded. Should this torque be exceeded, as by a jam at any point in the machine, the balls 432 will ride out of the recesses 433 and displace the spring opposed plate 436, thereby permitting the shaft 416 and gear 423 to turn idly without imparting rotation to the intermediate drive sleeve 425. Whenever this occurs the machine is automatically stopped by the functioning of safety devices which will be described hereinafter and which are caused to function by the displacement of the plate 436 above referred to.

A spur gear 440 is secured to the intermediate drive sleeve 425 and imparts rotation to an idler gear 441 which in turn drives the spur gear 442 secured on the shaft 443. The shaft 443 is rotatable in the bearing 444 and has a sprocket 445 secured thereon. The chain 446 passing over the sprocket 445 and over idlers 447 serves to drive the sprocket 388 on the weld timing and stacker driving shaft 349, 381, and also the weld electrode actuator shaft 183 through the sprocket 185.

Means are provided for manually turning over the machine parts, and this means includes the driver pinion 448 which meshes with the large bevel gear 423 and is secured on the shaft 449 which is rotatable in the frame bearing 450. A hand wheel 451 is slidably and rotatably mounted on the end of the bearing 450, and said hand wheel and the shaft 449 are provided with cooperating clutch faces 452. When the hand wheel is moved inwardly on its mounting so as to disengage the clutch faces, turning of the hand wheel will not impart rotation to the shaft 449, but when the hand wheel is moved outwardly so as to engage the clutch faces 452, turning of the hand wheel will impart rotation to the shaft 449, and by this means the machine parts may be hand operated.

*Safety stop devices*

Figure 4:
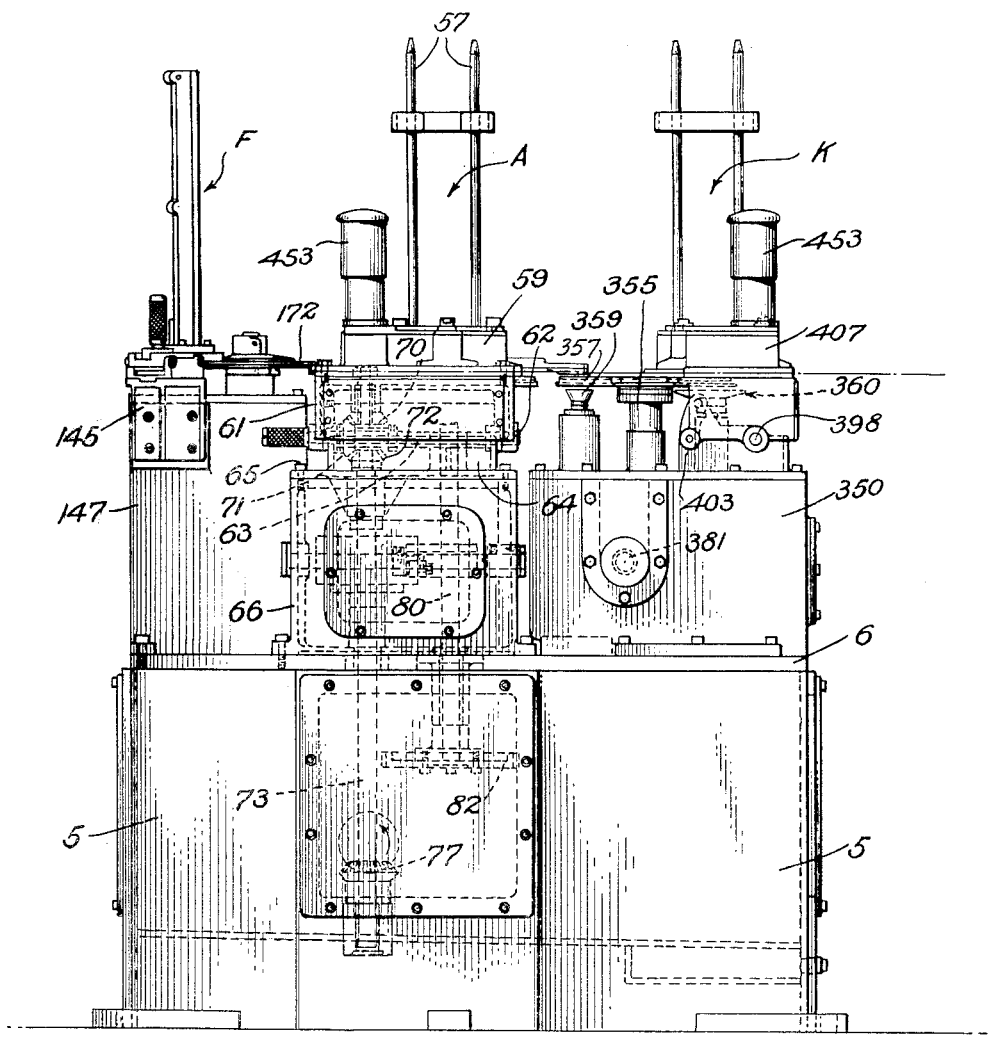
Figure 4 is a left end elevation of the machine shown in Figure 1.

Each of the can end supply and stacking units A and K is equipped with a jam stop control generally designated 453. These control units are best illustrated in Figures 4 and 5 of the drawings and each includes a casing 454 into which an extension 455 of the particular ring gear pinion bearing driver shaft section projects. Each said pinion is mounted on a sleeve 456 which is free on the shaft extension 455 but is secured as at 457 to a cup-like casing member 458 within the respective casing 454. Within each cup-like casing member 458 is mounted a driver collar 459 which is keyed on the respective shaft section extension 455. Driver balls 460 mounted in apertures in the collar 459 normally engage in driving contact in seats 461 provided in a driver ring 462 which is pin connected as at 463 to the cup-like casing member 458. Thus it will be apparent that normally the rotation of the shaft section 455 is imparted through the collar 459, ring 462 and cup-like casing 458 to the sleeve 456 and its ring gear driving pinion.

A closure cap 464 is threadably mounted on each cup-like casing member 458 and is equipped with a bearing extension 465 in which a hollow plunger 466 is slidably mounted. The plunger is equipped with a head 467 which is urged in yielding contact against the driver balls 460 by a compression spring 468 interposed between said head and the upper part of the extension 465. Whenever a jam occurs in the can end supply stack A or the can end stacking means K the overload torque will be sufficient to cause the balls 460 to ride out of the driving seats 461 and displace the presser head 467, thereby to permit the driving shaft section extension 455 to rotate freely without imparting rotation to the driver pinion sleeve 456. In other words, the collar 459 may rotate freely without imparting its rotation to the ring 462, the cup-like casing 458 and the sleeve 456.

A plunger 469 guided as at 470 in each cap extension 465 projects through the top of said extension and engages the respective head 467 at its lower end. The upwardly projected end extension of the plunger 469 engages a lever 471 which is pivoted as at 472 in the casing 454, downward movement of the lever being limited by the adjustably mounted stop screw 473. An adjustably mounted actuator screw 474 is carried by the lever 471 in position for engaging with the plunger 475 of a normally closed micro-switch 476. Whenever an overload occurs in the can end supplying or stacking device in the manner previously described, the upward displacement of the respective plunger 469 will bring about an opening of the micro-switch and this breaking of the control circuit will bring about a disengagement of the clutch 418 and a stopping of the machine in a manner to be described hereinafter.

A third safety control micro-switch 477 is provided and it is constructed and mounted in the manner best illustrated in Figures 3 and 24 of the drawings. This switch also is normally held closed and is mounted in a housing 478 secured on the frame table 6. Its plunger 479 is engaged by a pivotally mounted lever 480 which is yieldably held by a compression spring 481 against a stop screw 482, in which position the lever serves to retain the switch in the closed or circuit completing condition. The lever 480 is secured to the upper end of a rock shaft 483 which is rockable in a fixed bearing 484 and has an actuator lever 485 secured to its lower end. The actuator lever 485 is equipped with a roller 486 which is engageable by the plate 436 whenever it is displaced endwise by an overload in the manner previously described, thereby to rock the shaft 483 and displace the lever 480 from its switch closing position. In other words, each time the plate 436 is displaced by an overload, the lever 480 will be swung away and the switch 477 will be permitted to open and break the control circuit.

A normally energized solenoid air valve 487 is provided. So long as the solenoid of the air valve remains energized the valve will remain closed, but whenever said solenoid is de-energized the valve will open and permit air to pass through the line 488 into an air cylinder 489 wherein it will act against a piston connected by the thrust rod 490 with an extension 491 on the clutch actuator 419. Each time the thrust rod 490 is thus actuated it will function to disengage the clutch 418 and stop the machine.

In Figure 36 of the drawings there is diagrammatically illustrated one simple means of electrically connecting the various control and safety devices of the machine. In this illustration the power source lines 492 are connected as at 493 with the transformer 303 of the welding circuit through the cam actuated timing switch 343.

The testing and ejecting devices, including the solenoid 325 and the micro-switch 317, are connected in series as at 494 with said power lines through the cam control micro-switch 335. The solenoid air valve 487 and the three micro-switches 476, 477 are connected in series with the power lines as at 495. If desired, one or more manually operable stop switches 496 may also be connected in series with one of the connectors 495.

*Résumé of operation*

In the operation of the machine, the can ends to which keys are to be welded are hand filled into the stack A and are deposited from the bottom of the stack, one by one, into the serially presented pockets 93 of the infeeding transfer turret 91. As each of the infeeding turret pockets presents a can end in alignment with and beneath one of the main turret pockets, the vertically reciprocated lifting pad 95 lifts the can end out of the supporting ledge 94 and into the overlying main turret pocket, that is between the particular pair of depending pins. As the can end is moved into the main turret pocket it displaces the yieldable gripper fingers 38, and said fingers serve to hold the can end in place as the indexing movement of the main turret is started and moves said can end from between said fingers and onto the supporting ledges 27 and 30 of the inner and outer guide rings 26 and 28.

After the can end has been brought to rest at the scratching station E the scratching wheel 103 is forced downwardly into contact with the can end and is yieldably held thereagainst while the scratching edge 108 is reciprocated back and forth to remove the lacquer or other protective or decorative coating thereon and bare the metal in a manner for facilitating the welding of the key onto the bared metal surface.

The can end is next presented at the key feeding station. At this station a key deposited in one of the feeder plate openings 174 from the stack 137 is brought into registry over the then presented turret pocket key slot 37 and gravitates into the position on the can end to which it is to be weld-secured. The can end and key complement is next indexed by the main turret to an idle station, and thence into the welding station H.

While the can end is at rest at the welding station the upper and lower electrodes 286 and 219 are brought together against the can end and key complement in the manner clearly illustrated in Figures 12 and 15 of the drawings. The engagement of the upper electrode 286 tends to hold the center of the can end in contact with the bumper plate 222 at the tin line level while the bevelled edge portions 220 of the lower electrode, engaging the raw metal edge of the can end curl in the manner indicated at 237 in Figure 15 lifts said curled edge approximately $\frac{1}{32}$ of an inch above the tin line. See also Figure 28. This operation of the cover sets up a tension which combines with the raw metal edge contact in assuring good electrical contact which will greatly facilitate the welding of the key to the can end. With the upper and lower electrodes in contact with the key and can end in the manner stated the timing cam 348 functions to complete the welding circuit through the switch 343, the connectors 493, transformer, loop 302 and connectors 284 and 227 so as to effect the desired welding together of the key and can end. After the upper and lower electrodes are again separated under the control of the cams 270 and 203 the main turret is again indexed to present the can end and key complement at the testing and ejecting station I. It will be recalled that the cam 339 actuates the switch 335 to complete a circuit therethrough as each can end moves into the testing station. It will also be recalled that the switch 317 is a normally closed switch which is opened by the displacement of the lever 309 brought about by the passage of each can end to which a key has been securely welded. When the control circuit through the conductors 494 is thus opened the solenoid 325 will not be energized, but should a can end be devoid of a key, or have a key insecurely welded thereon so that the can end and key complement would not be effective to displace the lever 309 and open the switch 317, then the circuit would be complete through both switches 335 and 317 and the solenoid 325 would be energized. This would effect a depression of the ejector 333 which would force the defective can end from its position between the lever 309 and the yieldable ring section 318 and downwardly into the rejected can end receiving chute 341.

The next indexing movement of the main turret would present the can end and key complement between the gripper fingers 46 at the discharging and stacking station K. At this station the suction cup 359 would be moved upwardly into contact with the can end and would grip the same so that upon downward movement of the plunger 361 said can end would be stripped from its position between the fingers 46 and deposited on the underlying receiving ledge of the then presented pocket of the turret 357 to be later indexed through two steps by said turret into position for being lifted into the stacking devices. Simultaneously with the lifting of the suction cup 359 into contact with a can end in a main turret pocket at the discharging station, the lifting pad 360 lifts a can end and key complement from the pocket of the turret 357 then presented at the stacking station, moving said can end into position for being picked up and stacked by the stacking screws 408. Should the suction cup 359 for any reason fail to remove a can end and key complement from the overlying pocket of the main turret so that the same might be conveyed over the guide rings 26 and 28 toward the supply stack and there possibly bring about a jam, such a can end and key complement would be displaced beyond the terminus 54 of the outer guide ledge 30 by the deflecting cam 55.

The can ends preferably are placed in the supply stack A, and removed from the stacking means K, by hand.

It will be apparent by reference to Figure 36 of the drawings that so long as the circuit through the conductors 495, the solenoid air valve 487 and the safety switches 476 and 477 and the stop switch equipment 496 remain closed the clutch 418 will remain in the operative condition unless it is manually shifted by the devices 420, 419. However, should the stop switch equipment 496 be manipulated manually, or either safety switch 476 be opened as by a jam in the can end supply or stacking devices, or the switch 477 be permitted to open as a result of a jam in the machine driving connections, the circuit through the conductors 495 would become broken and the resulting opening of the solenoid valve 487 would direct air into the cylinder 489 and bring about a shifting of the thrust rod 490 effective to throw out the clutch 418 and discontinue operation of the machine.

While one form of the invention has been shown for purposes of illustration, it is to be clearly understood that various changes in the details of construction and arrangement of parts may be made without departing from the spirit and scope of the invention as defined in the appended claims.

I claim:

1. In a machine of the character described wherein is provided a welding station, means for serially presenting can end and key complements at said station to be weld-assembled, welding means, a support for the welding means, said welding means including opposing electrodes movable toward and from each other on said support, means for bringing about movement of separation of the electrodes as can end and key complements are to be moved to and from the welding station and movement of the electrodes to contact with can and key complements during welding at said station, frame means, means slidably mounting said support on said frame means, and means for sliding said support back and forth to present the welding means in operative position at the welding station or to retract the same to an out-of-the-way position, said last named means including an adjuster screw, a stationary thread bearing mounted on said frame means and through which the screw is threaded, and means on said support for rotatably mounting the screw and holding the same against longitudinal movement relative to said support.

2. In a machine for welding keys to can ends which have been punch formed so as to provide a raw metal peripheral edge portion, welding means including a pair of cooperating electrodes one of which is engageable with a key and the other being in part frusto-conical in shape and engageable in can end centering contact with the raw metal edge of the associated can end.

3. In a machine for welding keys to can ends which have been punch formed and shaped so as to provide an inwardly and downwardly turned raw metal edge portion, a welding means including a pair of cooperating electrodes one of which is engageable with a key and the other of which includes arcuate edge portions frusto-conical in shape and conforming in shape to and extending about and engageable in can end centering contact with the major portion of the circumference of said raw metal edge.

4. In a machine for welding keys to can ends which have been punch formed so as to provide a raw metal edge, said edge also being downwardly and inwardly curled, welding means including opposing upper and lower electrodes the upper one of which is engageable with a key and the lower one of which is engageable with a can end, said lower electrode including a central insulated portion engageable with the central portion of the can end in opposition to the upper electrode, and an outer portion annularly spaced about said inner portion presenting an inwardly and upwardly bevelled peripheral portion extending about a substantial portion of the circumference of the can end at an elevation for being effective when the electrodes are brought together with a can end and key complement between them to engage and make electrical contact with the raw metal edge of the can end and spring the same upwardly above its normal relation to said central portion in order to facilitate said electrical contact.

5. In a machine for welding keys to can ends which have been punch formed so as to provide a raw metal edge, said edge also being downwardly and inwardly curled, welding means including opposing upper and lower electrodes the upper one of which is engageable with a key and the lower one of which is engageable with a can end, an annular upstanding edge portion inwardly and upwardly bevelled at its periphery to make efficient electrical contact with the downwardly and inwardly curled raw metal can end edge.

6. In a machine for welding keys to can ends which have been punch formed so as to provide a raw metal edge, said edge also being downwardly and inwardly curled, welding means including opposing upper and lower electrodes the upper one of which is engageable with a key and the lower one of which is engageable with a can end, said upper electrode comprising an uprightly disposed tubular body having a closed bottom presented for engagement with a key and an inner tube spaced within the tubular body and spaced at its lower end above said closed bottom, coolant flow and return lines connected with the interior of the inner tube and the space surrounding said inner tube for circulating a coolant through the upper electrode, said lower electrode including a central insulated portion engageable with the central portion of the can end in opposition to the upper electrode, an annular spaced flange disposed to make electrical contact with the raw metal edge of the can end and a hollow body surrounding said central portion, and coolant flow and return lines connected with said central portion surrounding hollow body for circulating a coolant therethrough.

7. In a machine for welding keys to can ends which have been punch formed so as to provide a raw metal edge, welding means including opposing upper and lower electrodes the upper one of which is engageable with a key and the lower one of which is engageable with a can end, means for bringing about relative movement between the electrodes to cause them to engage and disengage can end and key complements presented therebetween, means for feeding can end and key complements into and out of position between the electrodes and including track ledges for supporting the can ends at diametrically opposite edge portions and an indexed turret having depending conveying devices for engaging the can ends intermediately of the supporting ledges for pushing them along said ledges, said lower electrode including a central insulated portion engageable with the central portion of the can end in opposition to the upper electrode, and an outer portion annularly spaced about said inner portion and extending about a substantial portion of the circumference of the can end at an elevation for being effective when the electrodes are brought together with a can end and key complement between them to engage and make electrical contact with the raw metal edge of the can end, side portions of said lower electrode being flattened adjacent said supporting ledges to permit the ledge supported can edge portions to extend freely thereover, and said annularly spaced can end edge contacting portion being recessed at diametrically opposite sides in the direction of progression of the can ends to clear the conveying devices depending from the turret.

8. In a machine for welding keys to can ends, welding means including a pair of cooperating electrodes one of which is engageable with a key and the other with an associated can end, means for bringing about relative movement between the electrodes to cause them to engage and disengage can end and key complements presented therebetween, and means for feeding can end and key complements into and out of position between the electrodes, said electrode moving means comprising a cam shaft, a reciprocable plunger carrying each electrode, a spring means constantly tending to move one plunger in a direction for engaging a can end and key complement, a spring means constantly tending to move the other plunger in a direction away from a can end and key complement, and a cam on said shaft associated with each said plunger and effective to oppose said spring means in controlling the positions of said electrodes.

9. In a machine for welding keys to can ends, welding means including a pair of cooperating upper and lower electrodes one of which is engageable with a key and the other with an associated can end, means for bringing about relative movement between the electrodes to cause them to engage and disengage can end and key complements presented therebetween, and means for feeding can end and key complements into and out of position between the electrodes, said electrode moving means comprising a cam shaft, a reciprocable plunger carrying the upper electrode, adjustable spring means constantly urging said plunger and upper electrode toward the can end and key complement, a reciprocable plunger carrying the lower electrode, spring means constantly urging said last named plunger and electrode away from the can end and key complement, a follower on the lower electrode carrying plunger, a cam on said shaft engaged by said follower for controlling lifting and lowering movement of the lower electrode into and out of contact with the can end and key complement, a second cam on said shaft, and a reciprocable thrust member aligned with the upper electrode carrying plunger and having a follower engaged with said second cam whereby the cam will vertically reciprocate said thrust member, said thrust member being of such length that in its uppermost position it will engage the upper electrode carrying plunger and lift the same above the can end and key complement, and in its lowermost position will be spaced below said upper electrode carrying plunger so that the associated spring means will yieldably press the upper electrode against the can end and key complement.

10. In a machine for welding keys to can ends and wherein is provided a welding station and a testing station, means for feeding can end and key complements to the welding station and to and past the testing station, means at the welding station for welding the key and can end complements in assembled relation, and key holding and can end deflecting devices effective at the testing station for testing the weld attachment of the key of each can end and key complement and for bringing about an ejecting of said testing station of each can end devoid of a key or to which a key has been insecurely welded, said last named means including track ledges for supporting the can ends at their edges as they are moved to and from the testing station, a conveyor for moving the can end and key complements over said ledges and including slotways into which the keys project upwardly from the can ends to be effective when properly welded to hold the can ends in line, a yieldable track section at said testing station, a yieldably mounted lever opposite said yieldable track section and normally projecting into the path of movement of can ends to be displaced laterally thereby whenever a properly welded can end and key complement is moved into the testing station but which is effective to laterally shift can ends devoid of keys or to which keys are insecurely welded, an ejector, solenoid operated means for operating the ejector to eject laterally shifted can ends, control switch means including a switch and an actuator lever movable with the yieldably mounted lever when it is displaced laterally by a can end to effect an opening of the switch, and control circuit means including said switch and effective each time the yieldably mounted lever displaces a can end laterally to energize said solenoid and actuate the ejector to eject said displaced can end.

11. Machine structure as defined in claim 10 in which the control circuit means includes a second control switch connected in series with the other switch in the circuit and means for closing the same each time a can end moves into the testing station.

12. In a machine for welding keys to can ends and wherein is provided a welding station and a testing station, means for feeding can end and key complements to the welding station and to and past the testing station, means at the welding station for welding the key and can end complements in assembled relation, track ledges for supporting the can ends at their edges as they are moved to and from the testing station, a conveyor for moving the can end and key complements over said ledges and including slotways into which the keys project upwardly from the can ends to be effective when properly welded to hold the can ends in line, an ejector at the testing and ejecting station, solenoid operated means for actuating the ejector and controlled in part by a normally open switch and devices for closing the switch each time a can end is moving into said testing and ejecting station, a normally closed switch connected in the solenoid circuit in series with the normally open switch, a tester lever so mounted as to be displaced upon the passing of each can end to which a key has been securely welded, and means for opening the normally closed switch each time the tester lever is displaced, said tester lever being effective to laterally displace any can end devoid of a key or to which a key has been insecurely welded, thereby to cause both switches to be closed when the can end is at the testing and ejecting station so as to energize the solenoid and effect an ejecting of the can.

13. Machine structure as defined in claim 12 in which there is included a can end edge guiding track section disposed opposite the tester lever and yieldably mounted so as to permit lateral shifting of can ends by said lever, said track section including a bevelled edge portion engageable by a can end edge being ejected in a manner for being displaced laterally thereby to clear the movement of ejection of said can end.

14. In a machine for weld-assembling can end and key complements, means including an indexed turret for presenting can end and key complements at a welding station and at a testing station, means including a feed stack and a transfer turret to feed can ends to the indexed turret, means for placing keys onto can ends on the indexed turret, means at the welding station for weld-securing the keys to the can ends presented thereat, means at the testing station for ejecting can ends devoid of keys or upon which keys have been insecurely welded, can end and key complement stacking means, means including a transfer turret for discharging the can end and key complements and transferring them to the stacking means, a common source of power for driving all said means, driving connections between said source of power and all of said means and including a driver shaft and a clutch for controlling the same and an intermediate driver element driven by said shaft, and control devices for cutting off the power source in the event of a jam in any of said means or the driving connections therewith and including, a clutch actuating piston and cylinder means, a solenoid valve for directing pressure fluid into the cylinder for causing the piston and cylinder means to disengage the clutch, a jam switch subject to being opened upon the occurrence of a jam in the feed stack, a jam switch subject to being opened upon occurrence of a jam affecting said intermediate driver element, and a jam switch subject to being opened upon occurrence of a jam in the stacking means, all said switches being connected with a source of electrical energy and in series with each other and with the solenoid whereby the opening of any switch will serve to bring about a deenergizing of the solenoid and the directing of pressure fluid into the cylinder to disengage said clutch and cut off the power source.

15. Machine structure as defined in claim 14 in which there is included at least one manually operable switch connected in series with the jam switches so that an operator may at will break the solenoid energizing circuit and bring about a disengagement of the clutch and a cutting out of the power source.

16. In a machine for welding keys to can ends which have been punch formed so as to provide a raw metal edge, welding means including opposing upper and lower electrodes the upper one of which is engageable with a key and the lower one of which is engageable with a can end, said upper electrode comprising an uprightly disposed tubular body having a closed bottom presented for engagement with a key and an inner tube spaced within the tubular body and spaced at its lower end above said closed bottom, coolant flow and return lines connected with the interior of the inner tube and the space surrounding said inner tube for circulating a coolant through the upper electrode, said lower electrode including a central insulated portion engageable with the central portion of the can end in opposition to the upper electrode, a hollow body surrounding said central portion and an upstanding annular flange having a frustoconical surface disposed to make electrical contact with the raw metal edge of the can end throughout a substantial portion of the circumference thereof and effective to hold the can end centered during welding of a key thereon, and coolant flow and return lines connected with said central portion surrounding hollow body for circulating a coolant therethrough.

17. In a machine for welding keys to can ends which have been punch formed so as to provide a raw metal edge, said edge also being downwardly and inwardly curled, welding means including opposing upper and lower electrodes the upper one of which is engageable with a key and the lower one of which is engageable with a can end, said upper electrode comprising an uprightly disposed tubular body having a closed bottom presented for engagement with a key and an inner tube spaced within the tubular body and spaced at its lower end above said closed bottom, coolant flow and return lines connected with the interior of the inner tube and the space surrounding said inner tube for circulating a coolant through the upper electrode, said lower electrode including a central insulated portion engageable with the central portion of the can end in opposition to the upper electrode, a hollow body surrounding said central portion and an upstanding annular flange having an inwardly and upwardly bevelled surface disposed to make electrical contact with the downwardly and inwardly curled raw metal edge of the can end throughout a substantial portion of the circumference thereof and effective to hold the can end centered during welding of a key thereon, and coolant flow and return lines connected with said central portion surrounding hollow body for circulating a coolant therethrough.

18. In a machine for welding keys to can ends which have been punch formed so as to provide a raw metal edge, welding means including opposing upper and lower electrodes the upper one of which is engageable with a key and the lower one of which is engageable with a can end, means for bringing about relative movement between the electrodes to cause them to engage and disengage can end and key complements presented therebetween, means for feeding can end and key complements into and out of position between the electrodes and including track ledges for supporting the can ends at diametrically opposite edge portions and an indexed turret having conveying devices for engaging the can ends intermediately of the supporting ledges for pushing them along said ledges, said lower electrode including a flange portion extending about a substantial portion of the circumference of the can end at an elevation for being effective when the electrodes are brought together with a can end and key complement between them to engage and make electrical contact with the raw metal edge of the can end, said annularly spaced can end edge contacting portion being recessed at diametrically opposite sides in the direction of progression of the can ends to clear said conveying devices.

19. In a machine of the character described wherein are included can end receiving and can end scratching stations, a can end supporting trackway including spaced rails having ledges disposed to engage under and support the can ends at diametrically opposed edge portions, conveyor means for moving the can ends along said ledges, a set of opposed spring pressed fingers at the receiving station disposed to yieldably grip can ends between them in alignment with said ledges, vertically reciprocable means at the receiving station for moving can ends in the direction of their axes into position between said fingers, can end scratching means, means for moving said scratching means upwardly and downwardly at said scratching station for contacting can ends thereat and transversely of the direction of movement of the can ends along said ledges while in contact with the can ends for scratching surface coating from can ends to bare base metal and provide an efficient welding locale, means for imparting reciprocation to said reciprocable can end moving means, means operated by said reciprocation imparting means for imparting the upward and downward movement to said scratching means, means for placing a key on the base metal portion of each can end scratched bare by said scratching means, and means for weld-securing each key so placed to the bare base metal can end portion engaged thereby, and means for holding each placed key in position on the underlying can end while moving from the key receiving position to the key welding position.

20. In a machine of the character described wherein is provided a scratching station, means for serially presenting can ends at said station, and means at said station for scratching can ends to lay bare the base metal thereof at a place whereon a key is to be welded, said scratching means including a scratching member, means for lifting and lowering the member to engage the same with serially presented can ends, and means for reciprocating the scratching means while in contact with each can end, means for placing a key on the base metal portion of each can end scratched bare by said scratching means, and means for weld-securing each key so placed to the bare base metal can end portion engaged thereby, and means for holding each placed key in position on the underlying can end while moving from the key receiving position to the key welding position.

21. In a machine of the character described wherein is provided a scratching station, means for serially presenting can ends at said station, and means at said station for scratching can ends to lay bare the base metal thereof at a place whereon a key is to be welded, said scratching means including a scratching member, means for lifting and lowering the member to engage the same with serially presented can ends, and means for reciprocating the scratching means while in contact with each can end, said lifting and lowering means including devices for applying a predetermined yielding pressure to the scratching member while it is in contact with each can end, means for placing a key on the base metal portion of each can end scratched bare by said scratching means, and means for weld-securing each key so placed to the bare base metal can end portion engaged thereby, and means for holding each placed key in position on the underlying can end while moving from the key receiving position to the key welding position.

22. In a machine of the character described wherein is provided a scratching station, means for serially presenting can ends at said station, and means at said station for scratching can ends to lay bare the base metal thereof at a place whereon a key is to be welded, said scratching means including a scratching member, a rod disposed in a generally horizotnal position and supporting said scratching member, a horizontally reciprocable slide, means pivotally mounting said rod on said slide for swinging movement in a vertical plane, a sleeve slidable on the rod and spaced from its pivotal mounting, a thrust member depending from said sleeve, means for reciprocating the slide to cause the scratching member to engage in scratching contact with a can end when lowered thereon, and means for vertically reciprocating the thrust member to move the scratching member into and out of contact with can ends, means for placing a key on the base metal portion of each can end scratched bare by said scratching means, and means for weld-securing each key so placed to the bare base metal can end portion engaged thereby, and means for holding each placed key in position on the underlying can end while moving from the key receiving position to the key welding position.

23. Machine structure as defined in claim 20 in which the scratching member is in the form of a wheel having a multiple of scratching surfaces spaced about its periphery, there being included means for rotatably mounting said wheel so that its scratching surfaces can be selectively presented for contact with can ends, and means for securing the wheel in selected positions of adjustment.

24. Machine structure as defined in claim 22 in which the thrust member for moving the scratching member upwardly and downwardly includes telescoped elements and spring means and cooperative abutments effective to cause the telescoped elements to move in unison without relative movement in presenting the scratching member in contact with and removing it away from a can end and for causing one said telescoped element to move with the means by which said thrust member is actuated and relative to the other of said telescoped elements after the scratching member engages a can end on its downward movement thereby to store energy in the spring means and yieldably press the scratching member against a can end during the process of scratching, means also being included for adjusting the amount of resistance to be offered by the spring means to said relative movement of the telescoped elements.

25. In a machine for welding keys to can ends which have a coating on their top surfaces, said keys each having a longitudinal shank and a head disposed transversely at one end of the shank, can end supporting means, means for moving can ends step by step in an arcuate path over said supporting means and including a plate overlying said supporting means and can ends thereon and having therein equidistantly spaced key shaped slots in which to receive keys resting on can ends and closely surround and accurately hold the keys against movement relative to the can ends in a horizontal plane and each including a radially extending key shank receiving portion, means at one stop station of the can end moving means and operable in each key shank receiving portion of a slot presented thereat for scratching the underlying can end coating to lay bare a limited area of base metal of each underlying can end within the confines of said presented radial slot portion whereon to weld a key, means at another said stop station for directing a key into a slot presented thereat and with its shank overlying the bared base metal of an underlying can end, and means at another said stop station for welding each key shank to said bared base metal while said key shank is accurately held in the respective slot.

26. In a machine for welding keys to can ends which have a coating on their top surfaces and a raw metal edge at the periphery of each thereof, said keys each having a longitudinal shank and a head disposed transversely at one end of the shank, can end supporting means, means for moving can ends step-by-step in an arcuate path over said supporting means and including a plate overlying said supporting means and can ends thereon and having therein equidistantly spaced key shaped slots in which to receive keys resting on can ends and closely surround and accurately hold the keys against movement relative to the can ends in a horizontal plane and each including a radially extending key shank receiving portion, means operable in each key shank receiving portion of a slot presented thereat for scratching the underlying can end coating to lay bare a limited area of base metal of each underlying can end within the confines of said presented radial slot portion whereon to weld a key, means at another said stop station for directing a key into a slot presented thereat and with its shank overlying the bared base metal of an underlying can end, and welding means at another said stop station and including a pair of cooperating electrodes one of which is engageable with the key and the other being in part frusto-conical in shape and engageable in can end centering contact with the raw metal edge of the can end.

27. Apparatus as defined in claim 25 wherein the scratching means comprises a scratching member, means for lifting and lowering the scratching member to present the same to and remove the same from a can end surface in the key confining slot, and means for reciprocating the scratching member in the direction of the length of a radially extended slot when one is presented thereunder and while in contact with an underlying can end.

28. Apparatus as defined in claim 25 wherein the scratching means comprises a scratching member, means for lifting and lowering the scratching member to present the same to and remove the same from a can end surface in the key confining slot, and means for reciprocating the scratching member in the direction of the length of a radially extended slot when one is presented thereunder and while in contact with an underlying can end, and means for applying a predetermined yielding pressure to the scratching member while it is in contact with a can end.

29. In a machine for weld-assembling can end and key complements, means for conveying can ends step-by-step through a succession of work stations, means for feeding can ends to the conveying means, means at a first work station and movable into and out of contact with a can end while it is at rest at said first work station for scratching surface coating from the base metal to which a key is to be welded, means on the can end conveying means for receiving keys and holding them in accurately placed relation one over each can end being conveyed by said conveying means, means at a second work station for placing keys in the key receiving and holding means as they are presented at said second work station, means at a third work station for welding together each key and can end complement presented thereat, said welding means including opposing electrodes movable toward and from each other, and means for bringing about movement of separation of the electrodes as can end and key complements are to be moved to and from said third work station and movement of the electrodes to contact with can end and key complements during welding at said third work station, means at a fourth station for applying lateral pressure against a can end tending to shift the same bodily laterally relative to the overlying key for testing the weld on each key and can end complement presented thereat and for ejecting any can end devoid of a key or to which a key is insecurely welded, and means at a fifth station for discharging and stacking the properly assembled key and can end complements.

30. In a machine for weld-assembling can end and key complements, means including a rotary turret and indexing devices therefor for conveying can ends step-by-step through a succession of work stations, means for feeding can ends to the conveying means, means at a first work station movable into and out of contact with a can end while it is at rest at said first work station for scratching surface coating from the base metal to which a key is to be welded on each can end presented at said first work station, means on the can end conveying means for receiving keys and holding them in accurately placed relation one over each can end being conveyed by said conveying means, means at a second work station for placing keys in the key receiving and holding means as they are presented at said second work station, means at a third work station for welding together each key and can end complement presented thereat, said welding means including opposing electrodes movable toward and from each other, and means for bringing about movement of separation of the electrodes as can end and key complements are to be moved to and from said third work station and movement of the electrodes to contact with can end and key complements during welding at said third work station, means at a fourth work station for applying lateral pressure against a can end tending to shift the same bodily laterally relative to the overlying key for testing the weld on each key and can end complement presented thereat and for ejecting any can end devoid of a key, or to which a key is insecurely welded, means at a fifth work station for discharging and stacking the properly assembled key and can end complements, and deflecting means disposed in the path of movement of said key and can end complements with said rotary turret and beyond said fifth station and between it and the can end feeding means for discharging by deflection any can end and key complements passing said discharge station.

31. In a machine for weld-assembling can end and key complements, means for conveying can ends step-by-step through a succession of work stations, means for feeding can ends to the conveying means, scraper means at a first work station for scratching surface coating from the base metal to which a key is to be welded on each can end presented at said first work station, means for moving the scraper means toward and from a can end at rest at said first work station and for horizontally reciprocating the same while in contact with a can end, means on the can end conveying means for receiving keys and holding them in accurately placed relation one over each can end being conveyed by said conveying means, means at a second work station for placing keys in the key receiving and holding means as they are presented at said second work station, means at a third work station for welding together each key and can end complement presented thereat, and means at another station for discharging the properly assembled key and can end complements.

(References on following page)

References Cited in the file of this patent

UNITED STATES PATENTS

| Number | Name | Date |
|---|---|---|
| 1,352,641 | Troyer | Sept. 14, 1920 |
| 1,368,490 | Dieckmann | Feb. 15, 1921 |
| 1,432,849 | Graham | Oct. 24, 1922 |
| 1,635,536 | Butler | July 12, 1927 |
| 1,734,080 | Drake | Nov. 5, 1929 |
| 1,745,889 | Bardet | Feb. 4, 1930 |
| 1,884,683 | Hermani | Oct. 25, 1932 |
| 1,918,662 | Phelps | July 18, 1933 |
| 1,999,596 | Roemer | Apr. 30, 1935 |
| 2,024,597 | Pfeiffer | Dec. 17, 1935 |
| 2,079,042 | Saines | May 4, 1937 |
| 2,129,845 | King et al. | Sept. 13, 1938 |
| 2,130,021 | Neugart | Sept. 13, 1938 |
| 2,310,413 | Friden | Feb. 9, 1943 |
| 2,331,540 | Dilling | Oct. 12, 1943 |
| 2,388,754 | Martindell | Nov. 13, 1945 |
| 2,393,997 | Lehmann | Feb. 5, 1946 |
| 2,394,822 | Teplitz | Feb. 12, 1946 |
| 2,431,325 | Hayes | Nov. 25, 1947 |
| 2,447,012 | Hayes | Aug. 17, 1948 |
| 2,450,655 | Goldsworthy | Oct. 5, 1948 |